US009865893B2

(12) United States Patent
Esswein et al.

(10) Patent No.: US 9,865,893 B2
(45) Date of Patent: Jan. 9, 2018

(54) ELECTROCHEMICAL ENERGY STORAGE SYSTEMS AND METHODS FEATURING OPTIMAL MEMBRANE SYSTEMS

(71) Applicant: Lockheed Martin Advanced Energy Storage, LLC, Bethesda, MD (US)

(72) Inventors: Arthur J. Esswein, Somerville, MA (US); Steven Y. Reece, Cambridge, MA (US); Thomas H. Madden, Glastonbury, CT (US); Thomas D. Jarvi, Manchester, CT (US); John Goeltz, Cambridge, MA (US); Desiree Amadeo, Belmont, MA (US); Evan R. King, Quincy, MA (US); Nitin Tyagi, Cambridge, MA (US)

(73) Assignee: Lockheed Martin Advanced Energy Storage, LLC, Bethesda, MD (US)

( * ) Notice: Subject to any disclaimer, the term of this patent is extended or adjusted under 35 U.S.C. 154(b) by 263 days.

(21) Appl. No.: 13/949,530

(22) Filed: Jul. 24, 2013

(65) Prior Publication Data

US 2014/0030631 A1    Jan. 30, 2014

Related U.S. Application Data

(63) Continuation-in-part of application No. 13/796,004, filed on Mar. 12, 2013, now Pat. No. 8,691,413, and
(Continued)

(51) Int. Cl.
*H01M 8/18* (2006.01)
*H01M 8/1018* (2016.01)
(Continued)

(52) U.S. Cl.
CPC .......... *H01M 8/1018* (2013.01); *H01M 2/16* (2013.01); *H01M 8/188* (2013.01); *H01M 8/20* (2013.01);
(Continued)

(58) Field of Classification Search
CPC ...... H01M 8/188; H01M 8/20; H01M 8/1018; H01M 2/16
See application file for complete search history.

(56) References Cited

U.S. PATENT DOCUMENTS 2,353,782 A    7/1944  Neumark
2,415,792 A    2/1947  Gravell
(Continued)

FOREIGN PATENT DOCUMENTS

AT    WO 2007101284 A1 *  9/2007  ............ H01M 8/188
CN         1284208 A        2/2001
(Continued)

OTHER PUBLICATIONS

Machine translation of WO 2007/101284 A1.*
(Continued)

*Primary Examiner* — Jonathan Jelsma
(74) *Attorney, Agent, or Firm* — McDermott Will & Emery LLP

(57) ABSTRACT

This invention is directed to aqueous redox flow batteries comprising ionically charged redox active materials and separators, wherein the separator is about 100 microns or less and the flow battery is capable of (a) operating with a current efficiency of at least 85% with a current density of at least about 100 mA/cm$^2$; (b) operating with a round trip voltage efficiency of at least 60% with a current density of at least about 100 mA/cm$^2$; and/or (c) giving rise to diffusion rates through the separator for the first active material, the second active material, or both, of about 1×10$^{-7}$ mol/cm$^2$-sec or less.

48 Claims, 5 Drawing Sheets

Related U.S. Application Data a continuation-in-part of application No. 13/948,497, filed on Jul. 23, 2013, now Pat. No. 9,768,463, which is a continuation-in-part of application No. 13/795,878, filed on Mar. 12, 2013, now Pat. No. 8,753,761.

(60) Provisional application No. 61/739,140, filed on Dec. 19, 2012, provisional application No. 61/739,538, filed on Dec. 19, 2012, provisional application No. 61/739,145, filed on Dec. 19, 2012, provisional application No. 61/738,546, filed on Dec. 18, 2012, provisional application No. 61/683,260, filed on Aug. 15, 2012, provisional application No. 61/676,473, filed on Jul. 27, 2012.

(51) Int. Cl.
*H01M 8/20* (2006.01)
*H01M 2/16* (2006.01)
*H01M 8/22* (2006.01)

(52) U.S. Cl.
CPC .... *H01M 8/222* (2013.01); *H01M 2008/1095* (2013.01); *H01M 2250/10* (2013.01); *H01M 2300/0082* (2013.01); *Y02B 90/14* (2013.01); *Y02E 60/528* (2013.01)

(56) References Cited

U.S. PATENT DOCUMENTS

| | | |
|---|---|---|
| 3,294,588 A | 12/1966 | Morton |
| 3,573,984 A | 4/1971 | Shah |
| 3,707,449 A | 12/1972 | Reinhardt et al. |
| 3,876,435 A | 4/1975 | Dollman |
| 3,919,000 A | 11/1975 | Yarrington |
| 3,929,506 A | 12/1975 | Leddy et al. |
| 3,985,517 A | 10/1976 | Johnson |
| 3,985,571 A | 10/1976 | Reinhardt et al. |
| 3,985,585 A | 10/1976 | Tuttle et al. |
| 4,046,861 A | 9/1977 | Reinhardt et al. |
| 4,064,324 A | 12/1977 | Eustace |
| 4,069,371 A | 1/1978 | Zito |
| 4,126,529 A | 11/1978 | DeBerry |
| 4,133,941 A | 1/1979 | Sheibley |
| 4,180,623 A | 12/1979 | Adams |
| 4,233,144 A | 11/1980 | Pace et al. |
| 4,362,791 A | 12/1982 | Kaneko et al. |
| 4,378,995 A | 4/1983 | Gratzfeld et al. |
| 4,410,606 A | 10/1983 | Loutfy et al. |
| 4,436,711 A | 3/1984 | Olson |
| 4,436,712 A | 3/1984 | Olson |
| 4,436,713 A | 3/1984 | Olson |
| 4,436,714 A | 3/1984 | Olson |
| 4,443,423 A | 4/1984 | Olson |
| 4,443,424 A | 4/1984 | Olson |
| 4,468,441 A | 8/1984 | D'Agostino et al. |
| 4,485,154 A | 11/1984 | Remick et al. |
| 4,520,083 A | 5/1985 | Prater et al. |
| 4,563,403 A | 1/1986 | Julian |
| 4,592,973 A | 6/1986 | Pemsler et al. |
| 4,617,244 A | 10/1986 | Greene |
| 4,818,646 A | 4/1989 | Takakubo et al. |
| 4,952,289 A | 8/1990 | Ciccone et al. |
| 4,959,135 A | 9/1990 | Zenner et al. |
| 5,258,109 A | 11/1993 | Vaughan |
| 5,264,097 A | 11/1993 | Vaughan |
| 5,310,608 A | 5/1994 | Ishizawa et al. |
| 5,318,865 A | 6/1994 | Kaneko et al. |
| 5,433,934 A | 7/1995 | Chang et al. |
| 5,472,807 A | 12/1995 | Licht et al. |
| 5,643,670 A | 7/1997 | Chung |
| 5,656,390 A * | 8/1997 | Kageyama ............ H01M 8/188 429/105 |
| 5,679,239 A | 10/1997 | Blum et al. |
| 5,759,711 A | 6/1998 | Miyabayashi et al. |
| 5,785,841 A | 7/1998 | Tseng |
| 5,876,581 A | 3/1999 | Itaya et al. |
| 5,910,366 A | 6/1999 | Chowdhury et al. |
| 6,030,517 A | 2/2000 | Lincot et al. |
| 6,054,230 A | 4/2000 | Kato |
| 6,143,443 A | 11/2000 | Kazacos et al. |
| 6,461,772 B1 | 10/2002 | Miyake et al. |
| 6,475,661 B1 | 11/2002 | Pellegri et al. |
| 6,485,868 B1 | 11/2002 | Tsujioka et al. |
| 6,555,989 B1 | 4/2003 | Pearson |
| 6,624,328 B1 | 9/2003 | Guerra |
| 7,046,418 B2 | 5/2006 | Lin et al. |
| 7,193,764 B2 | 3/2007 | Lin et al. |
| 7,252,905 B2 | 8/2007 | Clarke et al. |
| 7,265,162 B2 | 9/2007 | Yandrasits et al. |
| 7,348,088 B2 | 3/2008 | Hamrock et al. |
| 7,463,917 B2 | 12/2008 | Martinez |
| 7,508,568 B2 | 3/2009 | Lin et al. |
| 7,550,231 B2 | 6/2009 | Stauffer |
| 7,557,164 B2 | 7/2009 | Felix et al. |
| 7,625,663 B2 | 12/2009 | Clarke et al. |
| 7,645,540 B2 | 1/2010 | Boone et al. |
| 7,678,728 B2 | 3/2010 | Olson et al. |
| 7,745,056 B2 | 6/2010 | Lee et al. |
| 7,767,777 B2 | 8/2010 | Buesing et al. |
| 7,927,731 B2 | 4/2011 | Sahu |
| 7,931,981 B2 | 4/2011 | Boone et al. |
| 7,935,366 B2 | 5/2011 | Pahuja et al. |
| 7,998,335 B2 | 8/2011 | Feeney et al. |
| 8,129,554 B2 | 3/2012 | Schwaiger |
| 8,187,441 B2 | 5/2012 | Evans et al. |
| 8,691,413 B2 | 4/2014 | Esswein et al. |
| 8,753,761 B2 | 6/2014 | Esswein et al. |
| 2002/0083643 A1 | 7/2002 | Amendola et al. |
| 2002/0146618 A1 | 10/2002 | Licht |
| 2002/0177042 A1 | 11/2002 | Amendola |
| 2003/0228394 A1 | 12/2003 | Abdel-Monem et al. |
| 2004/0096746 A1 | 5/2004 | Wietelmann et al. |
| 2005/0098437 A1 | 5/2005 | Shiepe |
| 2005/0244707 A1 | 11/2005 | Skyllas-Kazacos et al. |
| 2006/0063065 A1 * | 3/2006 | Clarke et al. .............. 429/105 |
| 2007/0275291 A1 * | 11/2007 | Gu et al. .................. 429/44 |
| 2008/0274385 A1 | 11/2008 | Creeth |
| 2008/0292964 A1 | 11/2008 | Kazacos et al. |
| 2009/0110998 A1 | 4/2009 | Miyachi et al. |
| 2009/0130525 A1 | 5/2009 | Miyachi et al. |
| 2009/0208807 A1 | 8/2009 | Miyachi et al. |
| 2009/0308752 A1 | 12/2009 | Evans et al. |
| 2010/0003586 A1 | 1/2010 | Sahu |
| 2010/0059388 A1 | 3/2010 | Clarke et al. |
| 2010/0086823 A1 | 4/2010 | Koshino et al. |
| 2010/0239946 A1 | 9/2010 | Miyachi et al. |
| 2011/0014532 A1 | 1/2011 | Knuckey et al. |
| 2011/0136016 A1 | 6/2011 | Huang et al. |
| 2011/0189549 A1 | 8/2011 | Sun et al. |
| 2011/0195283 A1 * | 8/2011 | Sun ................. B60L 11/005 429/80 |
| 2011/0200890 A1 | 8/2011 | Kocherginsky |
| 2011/0223450 A1 | 9/2011 | Horne et al. |
| 2011/0244277 A1 | 10/2011 | Gordon, II et al. |
| 2011/0244367 A1 | 10/2011 | Watahiki et al. |
| 2012/0052347 A1 | 3/2012 | Wilson et al. |
| 2012/0077066 A1 | 3/2012 | Zhang |
| 2012/0077095 A1 | 3/2012 | Roumi et al. |
| 2012/0107661 A1 | 5/2012 | Lee et al. |
| 2012/0135278 A1 | 5/2012 | Yoshie et al. |
| 2012/0171541 A1 | 7/2012 | Park et al. |
| 2012/0183868 A1 | 7/2012 | Toussaint et al. |
| 2012/0196188 A1 | 8/2012 | Zhang et al. |
| 2012/0202099 A1 | 8/2012 | Perry et al. |
| 2012/0244406 A1 | 9/2012 | Xia et al. |
| 2012/0263990 A1 | 10/2012 | Kim |
| 2013/0004819 A1 | 1/2013 | Mun et al. |
| 2013/0157087 A1 | 6/2013 | Pandy et al. |
| 2013/0252062 A1 | 9/2013 | Wilkins et al. |
| 2013/0252137 A1 * | 9/2013 | Zhang et al. .............. 429/516 |
| 2014/0004403 A1 | 1/2014 | Yan et al. |
| 2014/0028260 A1 | 1/2014 | Goeltz et al. |
| 2014/0028261 A1 | 1/2014 | Esswein et al. |

(56) References Cited

U.S. PATENT DOCUMENTS

| | | |
|---|---|---|
| 2014/0051002 A1 | 2/2014 | Esswein et al. |
| 2014/0051003 A1 | 2/2014 | Esswein et al. |
| 2014/0080035 A1 | 3/2014 | Esswein et al. |
| 2014/0138576 A1 | 5/2014 | Esswein et al. |

FOREIGN PATENT DOCUMENTS

| | | |
|---|---|---|
| CN | 102142571 A | 8/2011 |
| CN | 102203984 A | 9/2011 |
| CN | 102544526 | 7/2012 |
| CN | 102790233 A | 11/2012 |
| EP | 0013113 A1 | 7/1980 |
| EP | 0595688 A1 | 5/1994 |
| EP | 0814527 | 4/2002 |
| EP | 1 411 576 | 4/2004 |
| EP | 1 901 379 | 3/2008 |
| EP | 1 290 068 | 8/2010 |
| EP | 2 235 781 | 10/2012 |
| EP | 2463950 | 8/2013 |
| FR | 1533662 A | 7/1968 |
| GB | 1 354 886 | 6/1974 |
| JP | S 52-114934 A | 9/1977 |
| JP | S 54-090538 A | 7/1979 |
| JP | S 55-113274 A | 9/1980 |
| JP | S 63-053860 A | 3/1988 |
| JP | H 03-245472 A | 11/1991 |
| JP | H 06-140082 A | 5/1994 |
| JP | H 08-185868 A | 7/1996 |
| JP | H 08-287938 A | 11/1996 |
| JP | H-11-260390 | 9/1999 |
| JP | 2002-216833 A | 8/2002 |
| JP | 2006-254682 A | 9/2006 |
| JP | 2008-305559 A | 12/2008 |
| JP | 2012-009448 A | 1/2012 |
| JP | 2012-079878 A | 4/2012 |
| SU | 176574 | 11/1965 |
| WO | WO 2004/095602 | 11/2004 |
| WO | WO 2006/135958 | 12/2006 |
| WO | WO 2007/044852 | 4/2007 |
| WO | WO 2007/101284 | 9/2007 |
| WO | WO 2011/075135 | 6/2011 |
| WO | WO-2011/098781 A1 | 8/2011 |
| WO | WO-2011/111717 A1 | 9/2011 |
| WO | WO 2011/149624 | 12/2011 |
| WO | WO-2012/027161 A2 | 3/2012 |
| WO | WO2012075810 A1 * | 6/2012 |
| WO | WO-2012/117543 A1 | 9/2012 |
| WO | WO-2012/134553 A2 | 10/2012 |
| WO | WO-2012/162383 A1 | 11/2012 |
| WO | WO 2013/006427 | 1/2013 |
| WO | WO 2013/048603 | 4/2013 |
| WO | WO-2014/018495 A2 | 1/2014 |
| WO | WO-2014/018589 A1 | 1/2014 |

OTHER PUBLICATIONS

International Patent Application No. PCT/US2013/051606: International Search Report and Written Opinion dated Dec. 9, 2013, 12 pages.

International Patent Application No. PCT/US2013/051767: International Search Report and Written Opinion dated Dec. 23, 2013, 7 pages.

International Patent Application No. PCT/US2013/051774: International Search Report and Written Opinion dated Dec. 23, 2013, 9 pages.

International Patent Application No. PCT/US2013/051790 International Search Report and Written Opinion dated Dec. 20, 2013, 7 pages.

International Patent Application No. PCT/US2013/051802: International Search Report and Written Opinion dated Dec. 23, 2013, 9 pages.

Borgias et al., "Synthetic, structural, and physical studies of titanium complexes of catechol and 3,5-di-tert-butylcatechol," Inorg. Chem., Apr. 1984, 23(8), 1009-1016.

Brezina et al., "Study of the reduction of oxygen on a carbon paste electrode in an alkaline medium," Coll. Czech. Chem. Commun., 1973, 38(10), 3024-3031.

Caulton, K. G., "Systematics and Future Projections Concerning Redox-Noninnocent Amide/Imine Ligands," Eur. J. Inorg. Chem., Jan. 2012, 2012(3), 435-443.

Chen et al., "Solution Redox Couples for Electrochemical Energy Storage: I. Iron (III)-Iron (II) Complexes with O-Phenanthroline and Related Ligands," Journal of the Electrochemical Society, Jul. 1981, 128(7), 1460-1467.

Cohen et al., "The Association of Ferrocyanide Ions With Various Cations," J. Phys. Chem., Aug. 1957, 61(8), 1096-1100.

Davies et al., "Electroceramics from Source Materials via Molecular Intermediates: $PbTiO_3$ from $TiO_2$ via $[Ti(catecholate)3]2-$," J. Am. Ceram. Soc., Aug. 1990, 73(8), 2570-2572.

Fryda et al., "Wastewater Treatment With Diamond Electrodes," Diamond Materials, Electrochemical Society Proceedings, 2000, 99(32), 473-483.

Gail, E. et al., "Cyano Compounds, Inorganic" in Ullmann's Encyclopedia of Industrial Chemistry, 2012, 10, 674-710.

Hollandsworth et al., "Zinc/Ferrocyanide Battery Development Phase IV" Lockheed Missiles and Space Company, Inc., Contractor report, Sandia Contract DE-AC04-76DP00789, May 1985, 278 pages.

Kim et al., "Novel catalytic effects of $Mn_3O_4$ for all vanadium redox flow batteries," Chem. Commun., Apr. 2012, 48(44), 5455-5457.

Kulesza et al., "Electrochemical preparation and characterization of hybrid films composed of Prussian blue type metal hexacyanoferrate and conducting polymer," Electrochimica Acta, Aug. 2001, 46(26-27), 4065-4073.

Modiba et al., "Electrochemical impedance spectroscopy study of Ce(IV) with aminopolycarboxylate ligands for redox flow batteries applications," Journal of Power Sources, May 2012, vol. 205, 1-9.

Modiba et al., "Electrochemical study of cerium(IV) in the presence of ethylenediaminetetraacetic acid (EDTA) and diethylenetriaminepentaacetate (DTPA) ligands," Journal of Applied Electrochemistry, Sep. 2008, 38(9), 1293-1299.

Modiba, P., "Electrolytes for redox flow battery systems," Dissertation presented for the degree of Doctor of Philosophy Chemistry at the University of Stellenbosch, Department of Chemistry and Polymer Science, Mar. 2010.

Nguyen et al., "Flow Batteries," The Electrochemical Society Interface, Fall 2010, 19(3), 54-56.

Pharr et al., "Infrared Spectroelectrochemical Analysis of Adsorbed Hexacyanoferrate Species Formed during Potential Cycling in the Ferrocyanide/Ferricyanide Redox Couple," Anal. Chem., Nov. 1997, 69(22), 4673-4679.

Raymond et al., "Coordination isomers of biological iron transport compounds. VI. Models of the enterobactin coordination site. A crystal field effect in the structure of potassium tris(catecholato)chromate(III) and –ferrate(III) sesquihydrates, $K_3[M(O_2C_6H_4)_3] \cdot 1.5H_2O$, M=chromium, iron," J. Am. Chem. Soc., Mar. 1976, 98(7), 1767-1774.

Steenken et al., "One-electron redox potentials of phenols. Hydroxy- and aminophenols and related compounds of biological interest," J. Phys. Chem., Sep. 1982, 86(18), 3661-3667.

Torres-Gomez et al., "Energy Storage in Hybrid Organic-Inorganic Materials Hexacyanoferrate-Doped Polypyrrole as Cathode in Reversible Lithium Cells," J. of The Electrochemical Society, 2000, 147(7), 2513-2516.

Wang et al., "Determination of iron, titanium, osmium, and aluminum with tiron by reverse-phase high performance liquid chromatography/electrochemistry," Microchem. J., Jun. 1991, 43(3), 191-197.

Weber et al., "Redox flow batteries: a review," Journal of Applied Electrochemistry, Oct. 2011, 41(10), 1137-1164.

Russian Office Action from Russian Patent Application No. 2015108957, dated Feb. 14, 2017.

Chinese Office Action from Chinese Patent Application No. 201380050783.8, dated May 3, 2017.

(56) References Cited

OTHER PUBLICATIONS

Hirai, et al., "Thermocharge and Discharge Characteristics of Thermochargeable Galvanic Cells," T. IEE Japan, vol. 116-A, No. 5, pp. 412-418.
Negishi, "Redox Flow Battery," The Journal of Fuel Cell Technology, 2003, vol. 2, No. 4, pp. 69-74 (English language translation only).
Japanese Office Action from Japanese Patent Application No. 2015-524408, dated Jun. 6, 2017.
Japanese Office Action from Japanese Patent Application No. 2015-524111, dated Jun. 6, 2017.
Japanese Office Action from Japanese Patent Application No. 2015-524407, dated Jun. 6, 2017.
Asahi Glass Co Ltd, "Selemion Ion Exchange Membranes," retrieved from http://www.selemion.com/SELC.pdf, accessed on Mar. 4, 2016.
Bae et al, "All-Chromium Redox Flow Battery for Renewable Energy Storage," International Journal of Green Energy, Mar. 2011, pp. 248-264, vol. 8, No. 2.
Lessner et al, "The Dependence of Aqueous Sulfer-Polysulfide Redox Potentiation Electrolyte Composition and Temperature," J Electrochem Soc, Jul. 1993, pp. 1847-1849, vol. 140, No. 7.
Leung et al, "Progress in redox flow batteries, remaining challenges and their applications in energy storage," RSC Advances, Jan. 2012, pp. 10125-10156, vol. 2, No. 27.
Leung, "Development of a Zinc-Cerium Redox Flow Battery," 2011 Doctoral Thesis, University of Southampton, 352 pages.
Leung, et al., "An undivided zinc-cerium redox flow battery operating at room temperature (295 K)," Electrochemistry Communications, 2011, vol. 13, pp. 770-773.
Leung, et al., "Ce(III)/Ce(iV) in methanesulfonic acid as the positive half cell of a redox flow battery," Electrochimica Acta, 2011, vol. 56, pp. 2145-2153.
Leung, et al., "Zinc deposition and dissolution in methanesulfonic acid onto a carbon composite electrode as the negative electrode reactions in a hybrid redox flow battery," Electrochimica Acta, 2011, vol. 56, pp. 6536-6546.
Leung, et al., Characterization of a zinc-cerium flow battery, Journal of Power Sources, 2011, vol. 195, pp. 5174-5185.
Sever, et al., "Visible Absorption Spectra of Metal-Catecholate and Metal-Tironate Complexes," Dalton Transactions, 2004, pp. 1061-1072.
Sigma-Aldrich, "Tris(hydroxymethyl)aminomethane," 2015, downloaded from <http://www.sigmaaldrich.com/catalog/products/sial/252859?lang=en&region=US>.
Trant, et al., "Solubility of Sodium Ferrocyanide and Potassium Ferrocyanide in Solutions of NaOH and KOH Mixtures at 25° C.," University of Rochester, The David T. Kearns Center, Xerox Undergraduate Research Fellows Program, Jul. 28, 2011, 1 page.
Vercillo, et al., "Solubility of Sodium Ferrocyanide in Sodium Hydroxide and Potassium Ferrocyanide in Potassium Hydroxide," University of Rochester, The David T. Kearns Center, Xerox Undergraduate Research Fellows Program, Jul. 28, 2011, 1 page.
Japanese Office Action from Japanese Patent Application No. 2015-524413, dated Jun. 20, 2017.

* cited by examiner

ELECTROCHEMICAL ENERGY STORAGE SYSTEMS AND METHODS FEATURING OPTIMAL MEMBRANE SYSTEMS

CROSS REFERENCE TO RELATED APPLICATIONS

This application is a continuation-in-part of U.S. application Ser. No. 13/796,004, filed Mar. 12, 2013, which claims priority to U.S. Application Ser. Nos. 61/739,140 and 61/739,538, both filed Dec. 19, 2012. This application is also a continuation-in-part of U.S. patent application Ser. No. 13/948,497, filed Jul. 23, 2013, which is a continuation-in-part from U.S. patent application Ser. No. 13/795,878, filed Mar. 12, 2013, which itself claims priority to U.S. Application Ser. No. 61/739,145, filed Dec. 19, 2012, U.S. Application Ser. No. 61/738,546, filed Dec. 18, 2012, U.S. Application Ser. No. 61/683,260, filed Aug. 15, 2012, and U.S. Application Ser. No. 61/676,473, filed Jul. 27, 2012. Each of these applications is incorporated by reference in its entirety for all purposes.

TECHNICAL FIELD

This disclosure relates to the field of energy storage systems, including electrochemical energy storage systems, batteries, and flow battery systems and methods of operating the same.

BACKGROUND

There exists a long-felt need for safe, inexpensive, easy-to-use, and reliable technologies for energy storage. Large scale energy storage enables diversification of energy supply and optimization of the energy grid. Existing renewable-energy systems (e.g., solar- and wind-based systems) enjoy increasing prominence as energy producers explore non-fossil fuel energy sources, however storage is required to ensure a high quality energy supply when sunlight is not available and when wind does not blow.

Electrochemical energy storage systems such as flow batteries have been proposed for large-scale energy storage. But existing flow batteries suffer from a variety of performance and cost limitations, including, for example, optimal separators, decoupling energy and power, system scalability, round trip energy efficiencies ($RT_{Eff}$), cycle life, and other areas.

Despite significant development effort, no flow battery technology has yet achieved widespread commercial adoption, owing to the materials and engineering hurdles that make system economics unfavorable. Accordingly, there is a need in the art for improved flow batteries.

Separators allow mobile ions, such as sodium or potassium, to flow between different electrolyte solutions while restricting the flow of active materials, such as vanadium or iron. Current efficiency of the flow battery is lost due to a variety of factors, including diffusive crossover of active materials, transference crossover of active materials, electrical shorting, parasitic side reactions, and shunt currents. Prior attempts to maximize mobile ion flow while minimizing active material crossover has involved the use of various types of polymers, separator thicknesses and other various techniques. Herein described is a novel solution to the problems associated with separators wherein current and voltage efficiencies are maximized, while separator thickness is minimized for a given current density.

SUMMARY

The present invention addresses these challenges. In one embodiment, the present disclosure provides, in one aspect, low-cost energy storage using aqueous, benign electrolytes and redox-active moieties that exhibit reversible electrochemistry and tunable redox potentials. This is achieved by a choice of electrolyte, separator thickness, separator composition, active material, and electrode composition to yield efficient cells that operate at high voltages.

Certain embodiments of the present invention provide flow batteries, each flow battery comprising a first electrolyte comprising an aqueous solution comprising a first active material containing at least one mobile ion, a second electrolyte comprising an aqueous solution comprising a second active material and at least one mobile ion, a first electrode in contact with said first aqueous electrolyte, a second electrode in contact with said second aqueous electrolyte, and a separator, wherein the flow battery is capable of operating with a current efficiency of at least about 90% with a current density of at least about 100 mA/cm² and wherein the separator has a thickness of about 100 microns or less.

Also provided are flow batteries comprising a first electrolyte comprising an aqueous solution comprising a first active material containing at least one mobile ion, a second electrolyte comprising an aqueous solution comprising a second active material and at least one mobile ion, a first electrode in contact with said first aqueous electrolyte, a second electrode in contact with said second aqueous electrolyte, a separator of about 100 microns thick or less, wherein the flow battery is capable of operating with a round trip voltage efficiency of at least about 60% with a current density of at least about 100 mA/cm².

Further provided are flow batteries, comprising a first electrolyte comprising an aqueous solution comprising a first active material containing at least one mobile ion, a second electrolyte comprising an aqueous solution comprising a second active material and at least one mobile ion, a first electrode in contact with said first aqueous electrolyte, a second electrode in contact with said second aqueous electrolyte, and a separator of thickness about 100 microns or less and capable of excluding about 98% of the first active material from the second electrolyte and excluding about 98% of the second active material from the first electrolyte.

Other embodiments provide flow batteries, comprising a first electrolyte comprising an aqueous solution comprising a first active material containing at least one mobile ion, a second electrolyte comprising an aqueous solution comprising a second active material and at least one mobile ion, a first electrode in contact with said first aqueous electrolyte, a second electrode in contact with said second aqueous electrolyte, and a separator of thickness about 100 microns or less and capable of having a selectivity in the range of from about 50 to about $10^6$ for one mobile ion over the first and second active materials.

Additional embodiments provide flow batteries, comprising a first electrolyte comprising an aqueous solution comprising a first active material containing at least one mobile ion, a second electrolyte comprising an aqueous solution comprising a second active material and at least one mobile ion, a first electrode in contact with said first aqueous electrolyte, a second electrode in contact with said second aqueous electrolyte and a separator having a thickness of about 100 microns or less and capable of giving rise to diffusion rates for the first active material, the second active material, or both, to be about $1 \times 10^{-7}$ mol/cm²-sec or less.

Other embodiments provide flow batteries, comprising a first electrolyte comprising an aqueous solution comprising a first active material containing at least one mobile ion, a second electrolyte comprising an aqueous solution comprising a second active material and at least one mobile ion, a first electrode in contact with said first aqueous electrolyte, a second electrode in contact with said second aqueous electrolyte, a separator of thickness of about 100 microns or less, wherein the separator is a porous membrane, and wherein the flow battery is capable of operating with a current efficiency greater than 85% with a current density of greater than about 100 mA/cm$^2$.

Further embodiments provide flow batteries, comprising a first electrolyte comprising an aqueous solution comprising a first active material containing at least one mobile ion, wherein the first active material has a net ionic charge, a second electrolyte comprising an aqueous solution comprising a second active material and at least one mobile ion, wherein the second active material has a net ionic charge, a first electrode in contact with said first aqueous electrolyte, a second electrode in contact with said second aqueous electrolyte, and a separator of thickness of about 100 microns or less, the separator comprising an ionomer membrane, wherein the net ionic charge of the first, second, or both active materials matches that of the ionomer membrane, and wherein the flow battery is capable of operating with a current efficiency of at least 90% with a current density of at least about 100 mA/cm$^2$.

Other embodiments provide flow batteries, comprising a first electrolyte comprising an aqueous solution comprising a first active material containing at least one mobile ion, a second electrolyte comprising an aqueous solution comprising a second active material and at least one mobile ion, a first electrode in contact with said first aqueous electrolyte, a second electrode in contact with said second aqueous electrolyte, and a separator of thickness about 100 microns or less, wherein the separator has a plurality of layers wherein at least one layer is capable of ionic conduction and at least one other layer is capable of selective ion transport, and wherein the flow battery is capable of operating with a current efficiency of at least about 90% with a current density at least about of 100 mA/cm$^2$.

Further embodiments provide flow batteries, comprising a first electrolyte, a second electrolyte, and a separator having a thickness of about 100 microns or less disposed within the flow battery to fluidically separate the first and second electrolytes while permitting ionic conduction of at least one mobile ion, characterized by coulombic efficiency losses due to shorting to about 1 mA/cm$^2$ or less Additional embodiments provide flow batteries, comprising a negative electrolyte comprising an aqueous solution comprising a first active material, a positive electrolyte comprising an aqueous solution comprising a second active material, the second active material being different from the first active material, and a separator thinner than about 10 microns disposed within the flow battery to fluidically separate the negative and positive electrolytes while permitting ionic conduction of mobile ions.

Other embodiments provide flow batteries, comprising a first electrolyte comprising an aqueous solution comprising a first active material containing at least one mobile ion, a second electrolyte comprising an aqueous solution comprising a second active material and at least one mobile ion, a first electrode in contact with said first aqueous electrolyte, a second electrode in contact with said second aqueous electrolyte, and a separator of thickness of about 100 microns or less, wherein the flow battery is capable of operating with an energy density of at least about 30 Wh/L.

Further embodiments provide flow batteries, comprising a first electrolyte comprising an aqueous solution comprising a first active material containing at least one mobile ion, a second electrolyte comprising an aqueous solution comprising a second active material and at least one mobile ion, a first electrode in contact with said first aqueous electrolyte, a second electrode in contact with said second aqueous electrolyte, and a separator of thickness of about 100 microns or less, and wherein the first, second, or both electrolytes have a pH in the range of about 1 to about 13.

Still other embodiments provide flow batteries, comprising a first electrolyte comprising an aqueous solution comprising a first active material containing at least one mobile ion, a second electrolyte comprising an aqueous solution comprising a second active material and at least one mobile ion, a first electrode in contact with said first aqueous electrolyte, second electrode in contact with said second aqueous electrolyte, and a separator comprising a continuous membrane.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings.

DETAILED DESCRIPTION OF ILLUSTRATIVE EMBODIMENTS

Figure 1:
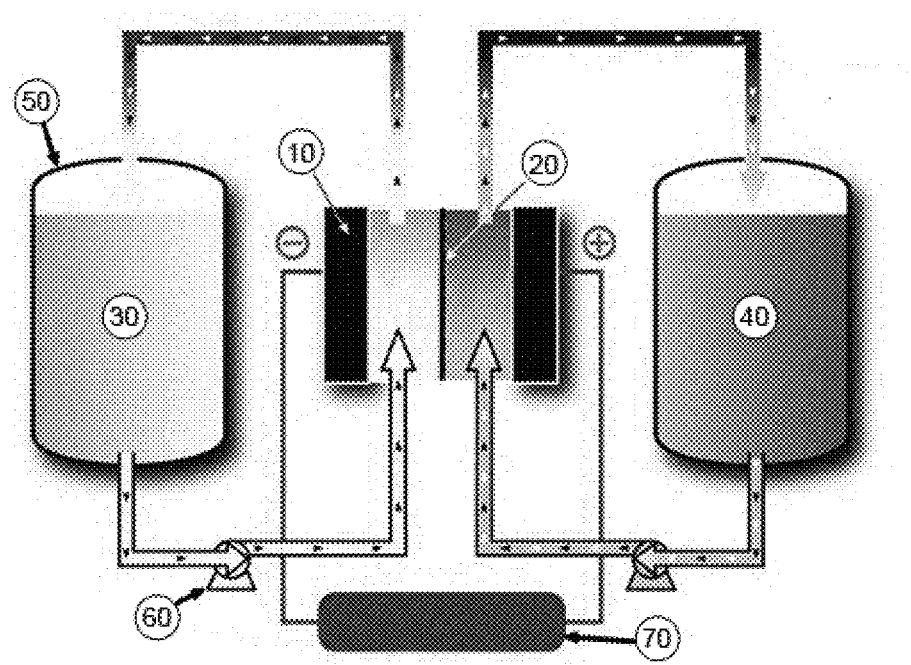
FIG. 1 depicts a schematic of an exemplary flow battery.

The present disclosure may be understood more readily by reference to the following description taken in connection with the accompanying Figures and Examples, all of which form a part of this disclosure. It is to be understood that this disclosure is not limited to the specific products, methods, conditions or parameters described and/or shown herein, and that the terminology used herein is for the purpose of describing particular embodiments by way of example only and is not intended to be limiting of any claimed disclosure. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer both to methods of operating a device and systems and to the devices and systems providing said methods. That is, where the disclosure describes and/or claims a method or methods for operating a flow battery, it is appreciated that these descriptions and/or claims also describe and/or claim the devices, equipment, or systems for accomplishing these methods.

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself.

Electrochemical energy storage systems typically operate through the interconversion of electrical and chemical energy. Various embodiments of electrochemical energy storage systems include batteries, capacitors, reversible fuel cells and the like, and the present invention may comprise any one or combination of these systems.

Unlike typical battery technologies (e.g., Li-ion, Ni-metal hydride, lead-acid, etc.), where energy storage materials and membrane/current collector energy conversion elements are unitized in a single assembly, flow batteries transport (e.g., via pumping) redox active energy storage materials from storage tanks through an electrochemical stack, as in exemplary FIG. 1, which is described elsewhere herein in further detail. This design feature decouples the electrical energy storage system power (kW) from the energy storage capacity (kWh), allowing for considerable design flexibility and cost optimization.

Flow batteries according to the present disclosure may also be described in terms of a first chamber comprising a negative electrode contacting a first aqueous electrolyte; a second chamber comprising a positive electrode contacting a second aqueous electrolyte, and a separator disposed between the first and second electrolytes. The electrolyte chambers provide separate reservoirs within the cell, through which the first and/or second electrolyte flow so as to contact the respective electrodes and the separator. Each chamber and its associated electrode and electrolyte defines its corresponding half-cell. The separator provides several functions which include, e.g., (1) serving as a barrier to mixing of first and second electrolytes; (2) electronically insulating to reduce or prevent short circuits between the positive and negative electrodes; and (3) to provide for ion transport between the positive and negative electrolyte chambers, thereby balancing electron transport during charge and discharge cycles. The negative and positive electrodes provide a surface for electrochemical reactions during charge and discharge. During a charge or discharge cycle, electrolytes may be transported from separate storage tanks through the corresponding electrolyte chambers. In a charging cycle, electrical power is applied to the system wherein the active material contained in the second electrolyte undergoes a one-or-more electron oxidation and the active material in the first electrolyte undergoes a one-or-more electron reduction. Similarly, in a discharge cycle the second electrolyte is reduced and the first electrolyte is oxidized producing electrical power.

To this point, the various embodiments have been described mainly in terms of individual flow batteries. It should be appreciated that, where possible, the descriptions should be read as including flow batteries that are operating or capable of operating with the specified characteristics. Similarly, the descriptions should be read as including systems of flow batteries, wherein the system comprises at least two of the flow batteries described herein.

An exemplary flow battery is shown in FIG. 1. As shown in that figure, a flow battery system may include an electrochemical cell that features a separator 20 (e.g., a membrane) that separates the two electrodes of the electrochemical cell. Electrode 10 is suitably a conductive material, such as a metal, carbon, graphite, and the like. Tank 50 may contain first redox material 30, which material is capable of being cycled between an oxidized and reduced state.

A pump 60 may effect transport of the first active material 30 from the tank 50 to the electrochemical cell. The flow battery also suitably includes a second tank (not labeled) that contains the second active material 40. The second active material 40 may or may not be the same as active material 30. A second pump (not labeled) may effect transport of second redox material 40 to the electrochemical cell. Pumps may also be used to effect transport of the active materials from the electrochemical cell to the tanks of the system. Other methods of effecting fluid transport—e.g., siphons—may be used to transport redox material into and out of the electrochemical cell. Also shown is a power source or load 70, which completes the circuit of the electrochemical cell and allows the user to collect or store electricity during operation of the cell.

It should be understood that FIG. 1 depicts a specific, non-limiting embodiment of a flow battery. Accordingly, devices according to the present disclosure may or may not include all of the aspects of the system depicted in FIG. 1. As one example, a system according to the present disclosure may include active materials that are solid, liquid, or gas and/or solids, liquids, or gases dissolved in solution. Active materials may be stored in a tank, in a vessel open to the atmosphere, or simply vented to the atmosphere.

In some cases, a user may desire to provide higher charge or discharge voltages than available from a single battery. In such cases, and in certain embodiments, then, several batteries are connected in series such that the voltage of each cell is additive. An electrically conductive, but non-porous material (e.g., a bipolar plate) may be employed to connect adjacent battery cells in a bipolar stack, which allows for electron transport but prevents fluid or gas transport between adjacent cells. The positive electrode compartments and negative electrode compartments of individual cells are suitably fluidically connected via common positive and negative fluid manifolds in the stack. In this way, individual electrochemical cells can be stacked in series to yield a voltage appropriate for DC applications or conversion to AC applications.

A region of a cell in a stack will represent a differential element (for example 2-60 cm$^2$) of a larger cell, which has practical areas of approximately 200 to 6000 cm$^2$ for useful devices. This differential element will be characterized by uniform conditions across that area, which includes positive and negative active material and electrolyte concentrations, voltage, and current density. A cell is represented by the entire active area range given above, where non-uniformities may exist in the active material and electrolyte concentrations, voltages, and current density.

In additional embodiments, the cells, cell stacks, or batteries are incorporated into larger energy storage systems, suitably including piping and controls useful for operation of these large units. Piping, control, and other equipment suitable for such systems are known in the art, and include, for example, piping and pumps in fluid communication with the respective electrochemical reaction chambers for moving electrolytes into and out of the respective chambers and storage tanks for holding charged and discharged electrolytes. The energy storage and generation systems described by the present disclosure may also include electrolyte circulation loops, which loops may comprise one or more valves, one or more pumps, and optionally a pressure equalizing line. The energy storage and generation systems of this disclosure can also include an operation management system. The operation management system may be any suitable controller device, such as a computer or microprocessor, and may contain logic circuitry that sets operation of any of the various valves, pumps, circulation loops, and the like.

A suitable flow battery system may comprise a flow battery (including a cell or cell stack); storage tanks and piping for containing and transporting the electrolytes; control hardware and software (which may include safety systems); and a power conditioning unit. The flow battery cell stack accomplishes the conversion of charging and discharging cycles and determines the peak power of energy storage system, which power may in some embodiments be in the kW range. The storage tanks contain the positive and negative active materials; the tank volume determines the quantity of energy stored in the system, which may be measured in kWh. The control software, hardware, and optional safety systems suitably include sensors, mitigation equipment and other electronic/hardware controls and safeguards to ensure safe, autonomous, and efficient operation of the flow battery energy storage system. Such systems are known to those of ordinary skill in the art. A power conditioning unit may be used at the front end of the energy storage system to convert incoming and outgoing power to a voltage and current that is optimal for the energy storage system or the application. For the example of an energy storage system connected to an electrical grid, in a charging cycle the power conditioning unit would convert incoming AC electricity into DC electricity at an appropriate voltage and current for the electrochemical stack. In a discharging cycle, the stack produces DC electrical power and the power conditioning unit converts to AC electrical power at the appropriate voltage and frequency for grid applications.

The energy storage systems of the present disclosure are, in some embodiments, suited to sustained charge or discharge cycles of several hour durations. As such, the systems of the present disclosure may be used to smooth energy supply/demand profiles and provide a mechanism for stabilizing intermittent power generation assets (e.g., from renewable energy sources). It should be appreciated, then, that various embodiments of the present disclosure include those electrical energy storage applications where such long charge or discharge durations are valuable. For example, non-limiting examples of such applications include those where systems of the present disclosure are connected to an electrical grid include, so as to allow renewables integration, peak load shifting, grid firming, baseload power generation consumption, energy arbitrage, transmission and distribution asset deferral, weak grid support, frequency regulation, or any combination thereof. Cells, stacks, or systems according to the present disclosure may be used to provide stable power for applications that are not connected to a grid, or a micro-grid, for example as power sources for remote camps, forward operating bases, off-grid telecommunications, remote sensors, or any combination thereof.

Flow battery energy storage efficacy is determined by both the round trip DC-DC energy efficiency ($RT_{EFF}$) and the energy density of the active materials (measured in Wh/L). The $RT_{EFF}$ is a composite of voltage and current efficiencies for both the battery charge and discharge cycles. In electrochemical devices, voltage and current efficiencies are functions of the current density, and while voltage and current efficiency typically decrease as current density (mA/cm$^2$) increases, high current densities are often desirable to reduce electrochemical stack size/cost used to achieve a given power rating. Active material energy density is directly proportional to the cell OCV (OCV=open circuit voltage), the concentration of active species, and the number of electrons transferred per mole of active species. High energy densities are desirable to reduce the volume of active materials required for a given quantity of stored energy.

It should be appreciated that, while the various embodiments described herein are described in terms of flow battery systems, the same strategies, designs, chemical embodiments, and combinations thereof, may also be employed with stationary (non-flow) electrochemical cells, batteries, or systems, including those where one or both half cells employ stationary electrolytes. Each of these embodiments is considered within the scope of the present invention.

Terms

Throughout this specification, words are to be afforded their normal meaning, as would be understood by those skilled in the relevant art. However, so as to avoid misunderstanding, the meanings of certain terms will be specifically defined or clarified.

The term "active material" is well known to those skilled in the art of electrochemistry and electrochemical energy storage and is meant to refer to materials which undergo a change in oxidation state during operation of the system. Active materials may comprise a solid, liquid, or gas and/or solids, liquids, or gasses dissolved in solution. In certain embodiments, active materials comprise molecules and/or supramolecules dissolved in solution. Active materials with a composition of matter described by this invention may be used in energy storage systems in such a way that they are paired with other active materials to form a positive couple and a negative couple wherein said other active materials are described by the present invention or are previously known in the art or a combination thereof, inclusive of soluble, semi-solid, intercalation, capacitive or pseudo-capacitive, and plating-type active materials. The concentration of the molecules may be greater than 2 M, between 1 and 2 M, about 1.5 M, between 0.5 M and 1M, or about 0.5 M or less. Separate embodiments provide upper concentrations of about 5 M, about 4M, about 3 M, about 2.5 M, or about 2 M.

Suitable active materials may comprise "metal ligand coordination compounds," which are known to those skilled in the art of electrochemistry and inorganic chemistry. A metal ligand coordination compound may comprise a metal ion bonded to an atom or molecule. The bonded atom or molecule is referred to as a "ligand." In certain non-limiting embodiments, the ligand may comprise a molecule comprising C, H, N, and/or O atoms. In other words, the ligand may comprise an organic molecule. The metal ligand coordination compounds of the present disclosure are understood to comprise at least one ligand that is not water, hydroxide, or a halide ($F^-$, $Cl^-$, $Br^-$, $I^-$).

Metal ligand coordination compounds may comprise a "redox active metal ion" and/or a "redox inert metal ion." The term "redox active metal ion" is intended to connote that the metal undergoes a change in oxidation state under the conditions of use. As used herein, the term "redox inert" metal ion is intended to connote that the metal does not undergo a change in oxidation state under the conditions of use. Metal ions may comprise non-zero valence salts of, e.g., Al, Ca, Co, Cr, Sr, Cu, Fe, Mg, Mn, Mo, Ni, Pd, Pt, Ru, Sn, Ti, Zn, Zr, V, or a combination thereof. The skilled artisan would be able to recognize the circumstances where a given non-zero valence metal would be redox active or inactive under the prescribed electrolyte environments. In specific embodiments, the first, second, or both first and second redox active material comprise a metal ligand coordination complex having a formula comprising $M(L1)_x(L2)_y(L3)_z^m$, M is Al, Ca, Ce, Co, Cr, Fe, Mg, Mn, Mo, Sn, Ti, W, Zn, or Zr;

L1, L2, and L3 are each independently ascorbate, a catecholate, citrate, a glycolate or polyol (including ligands derived from ethylene glycol, propylene glycol, or glycerol), gluconate, glycinate, α-hydroxyalkanoate (e.g., α-hydroxyacetate, from glycolic acid), β-hydroxyalkanoate, γ-hydroxyalkanoate, malate, maleate, a phthalate, a pyrogallate, sarcosinate, salicylate, or lactate;

x, y, and z are independently 0, 1, 2, or 3, and $1 \le x+y+z \le 3$;

and m is +1, 0, -1, -2, -3, -4, or -5. Related and independent embodiments provide that (a) x=3, y=z=0; (b) x=2, y=1, z=0; (c) x=1, y=1, z=1; (d) x=2, y=1, z=0; (e) x=2, y=z=0; or (f) x=1, y=z=0. In individual preferred embodiments, M is Al, Cr, Fe, or Ti and x+y+z=3.

In other specific embodiments, the first, second, or both first and second redox active material comprise a hexacyanide metal ligand coordination complex, for example comprising chromium, iron, manganese, molybdenum, or ruthenium, preferably a chromium, iron, or manganese hexacyanide, such as ferricyanide or ferrocyanide.

In other embodiments, the active material may comprise an "organic active material." An organic active material may comprise a molecule or supramolecule that does not contain a transition metal ion. It is further understood that organic active materials are meant to comprise molecules or supramolecules that are dissolved in aqueous solution. And organic active material is capable of undergoing a change in oxidation state during operation of the electrochemical energy storage system. In this case, the molecule or supramolecule may accept or donate an electron during operation of the system.

Unless otherwise specified, the term "aqueous" refers to a solvent system comprising at least about 98% by weight of water, relative to total weight of the solvent. In some applications, soluble, miscible, or partially miscible (emulsified with surfactants or otherwise) co-solvents may also be usefully present which, for example, extend the range of water's liquidity (e.g., alcohols/glycols). When specified, additional independent embodiments include those where the "aqueous" solvent system comprises at least about 55%, at least about 60 wt %, at least about 70 wt %, at least about 75 wt %, at least about 80%, at least about 85 wt %, at least about 90 wt %, at least about 95 wt %, or at least about 98 wt % water, relative to the total solvent. It some situations, the aqueous solvent may consist essentially of water, and be substantially free or entirely free of co-solvents or other species. The solvent system may be at least about 90 wt %, at least about 95 wt %, or at least about 98 wt % water, and, in some embodiments, be free of co-solvents or other species.

In addition to the redox active materials described below, the aqueous electrolytes may contain additional buffering agents, supporting electrolytes, viscosity modifiers, wetting agents, and the like.

The term "bipolar plate" refers to an electrically conductive, substantially nonporous material that may serve to separate electrochemical cells in a cell stack such that the cells are connected in series and the cell voltage is additive across the cell stack. The bipolar plate has two surfaces such that one surface of the bipolar plate serves as a substrate for the positive electrode in one cell and the negative electrode in an adjacent cell. The bipolar plate typically comprises carbon and carbon containing composite materials.

The term "cell geometry" is well known to those of ordinary skill in the art of electrochemistry and refers to the over physical construction of the flow battery.

The term "cell mechanical loading" is well known to those of ordinary skill in the art of electrochemistry and refers to the degree of mechanical compression that is experienced in an individual flow battery cell or, on an average basis by an individual cell in a stack of cells. The degree of mechanical compression is normally measured in psi.

The term "cell potential" is readily understood by those skilled in the art of electrochemistry and is defined to be the voltage of the electrochemical cell during operation. The cell potential may be further defined by Equation 1:

$$\text{Cell Potential} = OCV - \eta_{pos} - \eta_{neg} - iR \tag{1}$$

where OCV is the "open circuit potential", $\eta_{pos}$ and $\eta_{neg}$ are the overpotentials for the positive and negative electrodes at a given current density, respectively, and iR is the voltage loss associated with all cell resistances combined. The "open circuit potential" or OCV may be readily understood according to Equation 2:

$$OCV = E^+ - E^- \tag{2}$$

where $E^+$ and $E^-$ are the "half-cell potentials" for the redox reactions taking place at the positive and negative electrodes, respectively. The half-cell potentials may be further described by the well-known Nernst Equation 3:

$$E = E^\circ - RT/nF \ln(X_{red}/X_{ox}) \tag{3}$$

wherein $E^\circ$ is the standard reduction potential for redox couple of interest (e.g., either the positive or negative electrode), the R is the universal gas constant, T is temperature, n is the number of electrons transferred in the redox couple of interest, F is Faraday's constant, and $X_{red}/X_{ox}$ is the ratio of reduced to oxidized species at the electrode.

The OCV of a battery system may be measured by using standard techniques when the current flow between the first and second electrode is equal to zero. In this condition the voltage difference between the first and second electrodes corresponds to the OCV. The OCV of a battery system depends on the state of charge (SOC) of said system. Without being bound to the correctness of any theory, the OCV of an ideal battery will change with state of charge according to the Nernst equation (equation 4 above). For simplicity in this application all OCVs will be referenced to their values at 50% SOC. Those of ordinary skill in the art will recognize that at higher SOCs the OCV of a battery will increase, and at lower SOCs the OCV will decrease from the value at 50% SOC.

The term "charge" refers to the "net charge" or total charge associated with an active material or ionomer moiety.

The term "current density" is well known to those of ordinary skill in the art of electrochemistry and refers to the total current passed in an electrochemical cell divided by the geometric area of the electrodes of the cell and is commonly reported in units of $mA/cm^2$. In certain embodiments of the present invention, current densities may be in a range of from about 50 $mA/cm^2$, from about 100 $mA/cm^2$ or from about 200 $mA/cm^2$, to about 200 $mA/cm^2$, to about 300 $mA/cm^2$, to about 400 $mA/cm^2$, or to about 500 $mA/cm^2$, and these ranges may also apply to those embodiments referred to as providing "at least 100 $mA/cm^2$."

The term "current efficiency" ($I_{EFF}$) may be described as the ratio of the total charge produced upon discharge of the system to the total charge passed upon charge. In some embodiments, the charge produced on discharge or passed on charge can be measured using standard electrochemical coulomb counting techniques well known to those of ordinary skill in the art. Without being bound by the limits of any theory, the current efficiency may be a function of the state of charge of the flow battery. In some non-limiting embodiments the current efficiency can be evaluated over an SOC range of about 35% to about 60%.

The term "diffusion media properties" is well known to those of ordinary skill in the art of electrochemistry and refers to the properties of a material that allow ions or molecules to diffuse across that material.

The term "energy density" refers to the amount of energy that may be stored, per unit volume, in the active materials. Energy density, as used herein, refers to the theoretical energy density of energy storage and may be calculated by Equation 4:

$$\text{Energy density} = (26.8 \text{ A-h/mol}) \times OCV \times [e^-] \tag{4}$$

where OCV is the open circuit potential at 50% state of charge, as defined above, (26.8 A-h/mol) is Faraday's constant, and $[e^-]$ is the concentration of electrons stored in the active material at 99% state of charge. In the case that the active materials largely comprise an atomic or molecular species for both the positive and negative electrolyte, $[e^-]$ may be calculated as:

$$[e^-] = [\text{active materials}] \times n/2 \tag{5}$$

where [active materials] is the concentration (mol/L or M) of the active material in either the negative or positive electrolyte, whichever is lower, and n is the number of electrons transferred per molecule of active material. The related term "charge density" refers to the total amount of charge that each electrolyte may contain. For a given electrolyte:

$$\text{Charge density} = (26.8 \text{ A-h/mol}) \times [\text{active material}] \times n \tag{6}$$

where [active material] and n are as defined above.

The term "energy efficiency" may be described as the ratio of the total energy produced upon discharge of the system to the total energy consumed upon charge. The energy efficiency ($RT_{EFF}$) may be computed by Equation 7:

$$RT_{EFF} = V_{EFF,RT} \times I_{EFF} \tag{7}$$

As used herein, the term "evolution current" describes the portion of the electrical current applied in an energized flow battery configuration which is associated with the evolution (generation) of a particular chemical species. In the current context, then, when a sufficient overpotential vide infra) is applied in a flow battery such that either or both oxygen evolves at the positive electrode or hydrogen evolves at the negative electrode, that portion of the current associated with the evolution of oxygen or hydrogen is the oxygen evolution current or hydrogen evolution current, respectively.

In certain preferred embodiments, there is no current associated with hydrogen evolution, oxygen evolution, or both hydrogen and oxygen evolution. This may occur when the positive half-cell is operating at a potential less than the thermodynamic threshold potential or the threshold overpotential of the positive electrode (i.e., no oxygen produced; see explanation of terms below) or the negative half-cell cell is operating at a potential more positive than the thermodynamic threshold potential or the threshold overpotential of the negative electrode (i.e., no hydrogen produced), or both. In separate embodiments, the batteries operates within 0.3 V, within 0.25 V, within 0.2 V, within 0.15 V, or within 0.1 V of either the thermodynamic threshold potential or the threshold overpotential of the respective positive or negative electrodes.

In embodiments wherein gas is evolved, the portion of current associated with gas evolution (either hydrogen or oxygen or both) is suitably less than about 20%, less than about 15%, less than about 10%, less than about 5%, less than about 2%, or less than about 1% of the total applied current. Lower gas evolution currents are considered particularly suitable for battery (cell or cell stack) efficiencies.

The term "excluding" refers to the ability of a separator to not allow certain ions or molecules to flow through the separator and typically is measured as a percent.

The term "mobile ion" is understood by those skilled in the art of electrochemistry and is meant to comprise the ion which is transferred between the negative and positive electrode during operation of the electrochemical energy storage system. Unless otherwise indicated, the term "mobile ion" refers to an ion that carries greater than at least 80% of the ionic current during charge/discharge. Separate embodiments provide that the ion may carry greater than 90% or great than 95% of the ionic current during charge/discharge As used herein, the terms "negative electrode" and "positive electrode" are electrodes defined with respect to one another, such that the negative electrode operates or is designed or intended to operate at a potential more negative than the positive electrode (and vice versa), independent of the actual potentials at which they operate, in both charging and discharging cycles. The negative electrode may or may not actually operate or be designed or intended to operate at a negative potential relative to the reversible hydrogen electrode. The negative electrode is associated with the first aqueous electrolyte and the positive electrode is associated with the second electrolyte, as described herein.

The term "overpotential" is well understood by those skilled in the art of electrochemistry and is defined by the difference in voltage between an electrode during operation of an electrochemical cell and the normal half-cell potential of that electrode, as defined by the Nernst equation. Without being bound by theory, the term overpotential is meant to describe the energy, in excess of that required by thermodynamics, to carry out a reaction at a given rate or current density. The term "overpotential" also describes a potential more positive than the thermodynamic onset voltage for oxygen evolution from water at the positive electrode and more negative than the thermodynamic onset voltage for hydrogen evolution from water at the negative electrode.

Similarly, as used herein, the term "threshold overpotential" refers to the overpotential at which either hydrogen or oxygen gas begins to evolve at the respective electrode. Note that an electrochemical system comprising "imperfect" (i.e., less than ideal catalytically) electrodes can be operated in three regions: (a) at a potential "below" the thermodynamic onset potential (i.e., more positive than the thermodynamic onset potential of the negative electrode and more negative than the thermodynamic onset potential of the positive electrode; no gas evolving so no gas evolution current); (b) at a potential between the thermodynamic threshold potential and threshold overpotential (no gas evolving and still no evolution current); and (c) beyond the threshold overpotential (gas evolving and exhibiting a gas evolution current). Such threshold overpotentials can be identified by those skilled in the art for a given system, for example, by measuring gas evolution as a function of applied half-cell potential (using e.g., a mass spectrometer), in the presence or absence of an electroactive material. See also below.

The gas evolution threshold potentials are also affected by the nature of the electrolytes. Certain chemicals are known to inhibit the evolution of hydrogen and oxygen in electrolytic cells, either because of some activity in the bulk electrolyte or because of their ability to coat or otherwise deactivate their respective electrodes; for example, macromolecules or oligomers or salts, such as chloride or phosphate, on Pt surfaces. Accordingly, in certain embodiments, then, either the first or second or both first and second electrolytes comprise at least one compound increases the hydrogen or oxygen threshold overpotential of the system, respectively.

As used herein, the terms "regenerative fuel cell" or "reversible fuel cell" or "flow battery" or "flow energy device" connote the same or similar type of device, which utilizes the same battery configuration (including cell or cell stack) for both energy storage and energy generation.

The term "reversible hydrogen electrode," or RHE, is used in its conventional meaning. That is, a reversible hydrogen electrode (RHE) is a reference electrode. The potential of the RHE, E(RHE) corresponds to the potential for Equation 8:

$$2H^+ + 2e^- \leftrightarrow H_2 \qquad (8)$$

When the reaction of Equation 8 is carried out at equilibrium at a given pH and 1 atm $H_2$. This potential can be reference to a normal hydrogen electrode, E(NHE), by the following relation:

$$E(\text{RHE}) = E(\text{NHE}) - 0.059 \times pH = 0.0 \text{ V} - 0.059 \times pH \qquad (9)$$

where E(NHE) is the potential for the normal hydrogen electrode (NHE=0.0 V), defined as the potential for the reaction of Equation 8 at standard state (1M $H^+$, 1 atm $H_2$). Thus a potential of 0 V vs. RHE corresponds to a voltage of 0 V vs. NHE at pH 0 and −0.413 V vs. NHE at pH 7.

The term "selectivity" is well known to those of ordinary skill in the art of electrochemistry and refers to the ability of a membrane to allow a ratio of the movement of mobile ions to active materials through a membrane. For example, a membrane that allows a 50:1 ratio of mobile ions to active materials to pass through would have a selectivity of 50.

The terms "separator" and "membrane" refer to an ionically conductive, electrically insulating material disposed between the positive and negative electrode of an electrochemical cell.

The polymer electrolytes useful in the present disclosure may be anion or cation conducting electrolytes. Where described as an "ionomer," the term refers to a polymer comprising both electrically neutral and a fraction of ionized repeating units, wherein the ionized units are pendant and covalently bonded to the polymer backbone. The fraction of ionized units may range from about 1 mole percent to about 90 mole percent, but may be further categorized according to their ionized unit content. For example, in certain cases, the content of ionized units are less than about 15 mole percent; in other cases, the ionic content is higher, typically greater than about 80 mole percent. In still other cases, the ionic content is defined by an intermediate range, for example in a range of about 15 to about 80 mole percent. Ionized ionomer units may comprise anionic functional groups comprising carboxylates, sulfonates, phosphonates, salts of a carboxy acid, sulfonic acid, phosphonic acid, and the like. These functional groups can be charge balanced by, mono-, di-, or higher-valent cations, such as alkali or alkaline earth metals. Ionomers may also include polymer compositions containing attached or embedded quaternary ammonium, sulfonium, phosphazenium, and guanidinium residues or salts. The polymers useful in the present disclosure may comprise highly fluorinated or perfluorinated polymer backbones. Certain polymer electrolytes useful in the present disclosure include copolymers of tetrafluoroethylene and one or more fluorinated, acid-functional co-monomers, which are commercially available as NAFION™ perfluorinated polymer electrolytes from E. I. du Pont de Nemours and Company, Wilmington Del. Other useful perfluorinated electrolytes comprise copolymers of tetrafluoroethylene (TFE) and $FSO_2—CF_2CF_2CF_2CF_2—O—CF=CF_2$.

The term "stack" or "cell stack" or "electrochemical cell stack" refers to a collection of individual electrochemical cells that are in electrically connected. The cells may be electrically connected in series or in parallel. The cells may or may not be fluidly connected.

The term "state of charge" (SOC) is well understood by those skilled in the art of electrochemistry, energy storage, and batteries. The SOC is determined from the concentration ratio of reduced to oxidized species at an electrode ($X_{red}/X_{ox}$). For example, in the case of an individual half-cell, when $X_{red}=X_{ox}$ such that $X_{red}/X_{ox}=1$, the half-cell is at 50% SOC, and the half-cell potential equals the standard Nernstian value, E°. When the concentration ratio at the electrode surface corresponds to $X_{red}/X_{ox}=0.25$ or $X_{red}/X_{ox}=0.75$, the half-cell is at 25% and 75% SOC respectively. The SOC for a full cell depends on the SOCs of the individual half-cells and in certain embodiments the SOC is the same for both positive and negative electrodes. Measurement of the cell potential for a battery at OCV, and using Equations 2 and 3 the ratio of $X_{red}/X_{ox}$ at each electrode can be determined, and therefore the SOC for the battery system.

The term "supporting electrolyte" is well-known in the arts of electrochemistry and energy storage, and is intended to refer to any species which is redox inactive in the window of electric potential of interest and aids in supporting charge and ionic conductivity. In the present case, a supporting electrolyte does not substantially compromise the solubility of the coordination complex. Non-limiting examples include salts comprising an alkali metal, ammonium ion including an ammonium ion partially or wholly substituted by alkyl or aryl groups, halide (e.g., $Cl^-$, $Br^-$, $I^-$), chalcogenide, phosphate, hydrogen phosphate, phosphonate, nitrate, sulfate, nitrite, sulfite, perchlorate, tetrafluoroborate, hexafluorophosphate, or a mixture thereof, and others known in the art.

The term "voltage efficiency" may be described as the ratio of the observed electrode potential, at a given current density, to the half-cell potential for that electrode (×100%), wherein the half-cell potential is calculated as described above. Voltage efficiencies can be described for a battery charging step, a discharging step, or a "round trip voltage efficiency". The round trip voltage efficiency ($V_{EFF,RT}$) at a given current density can be calculated from the cell voltage at discharge ($V_{Discharge}$) and the voltage at charge ($V_{charge}$) using Equation 10:

$$V_{EFF,RT}=V_{Discharge}/V_{Charge}\times 100\% \quad (10)$$

Exemplary Operating Characteristics

The present disclosure provides a variety of technical features of the disclosed systems and methods. It should be understood that any one of these features may be combined with any one or more other features. For example, a user might operate a system featuring an electrolyte that includes an organic active material (e.g., a quinone), wherein that electrode has a pH of about 3. Such a system might also feature a membrane separator having a thickness of about 35 microns. It should be further understood that the present disclosure is not limited to any particular combination or combinations of the following features.

Mobile ions typically include proton, hydronium, or hydroxide. In various embodiments of the present disclosure, one may additionally transport ions other than proton, hydronium, or hydroxide (e.g., when these ions are present in comparatively low concentration, such as below 1M). Separate embodiments of these methods of operating a flow battery include those wherein the mobile ion does not consist essentially of protons, hydronium, or hydroxide. In this embodiment, about 50% or less of the mobile ions comprise protons, hydronium, or hydroxide. In other embodiments, about 40% or less, about 30% or less, about 20% or less, about 10% or less, about 5% or less, or about 2% or less of the mobile ions comprise protons, hydronium, or hydroxide. Exemplary mobile ions in these embodiments include alkali metal or alkaline earth metal cations (especially $Li^+$, $Na^+$, $K^+$, $Mg^{2+}$, $Ca^{2+}$ $Sr^{2+}$, $F^-$, $Cl^-$, $Br^-$, or $OH^-$).

In some embodiments of the present disclosure, it is advantageous to operate between pH 1 and 13 (e.g. to enable active material solubility and/or low system cost). Accordingly, one or both electrolytes can be characterized as having a pH in the range of from about 1 to about 13, or between about 2 and about 12, or between about 4 and about 10, or even between about 6 and about 8. In other independent embodiments, one or both electrolytes can be characterized as having a pH in the range of from about 1 to about 3, or between about 3 and about 6, or between about 6 and about 9, or even between about 9 and about 13. In some embodiments, the pH of the electrolyte may be maintained by a buffer. Typical buffers include salts of phosphate, borate, carbonate, silicate, trisaminomethane (Tris), 4-(2-hydroxyethyl)-1-piperazineethanesulfonic acid (HEPES), piperazine-N,N'-bis(ethanesulfonic acid) (PIPES), and combinations thereof. A user may add an acid (e.g., HCl, $HNO_3$, $H_2SO_4$ and the like), a base (NaOH, KOH, and the like), or both to adjust the pH of a given electrolyte as desired.

The pH of the first and second electrolytes may suitably be equal or substantially similar; in other embodiments, the pH of the two electrolytes differ by a value in the range of about 0.1 to about 2 pH units, about 1 to about 10 pH units, about 5 to about 12 pH units, about 1 to about 5 pH units, about 0.1 to about 1.5 pH units, about 0.1 to about 1 pH units, or about 0.1 to about 0.5 pH. In this context, the term "substantially similar," without further qualification, is intended to connote that the difference in pH between the two electrolytes is about 1 or less pH unit. Additional optional embodiments provide that the pH difference is about 0.4 or less, about 0.3 or less, about 0.2 or less, or about 0.1 or less pH units.

The disclosed systems and methods may also comprise active materials and membrane ionomers which are charged. The term "charge" in refers to the "net charge" or total charge associated with an active material or ionomer moiety. The charged species may be anionic or cationic. In certain desired embodiments of the present disclosure it is advantageous for the active materials and membrane ionomers to comprise charges of the same sign (e.g. to prevent transfer of the active material across the membrane).

Systems and methods according to the present disclosure also feature active materials comprising metal-ligand coordination compounds. Metal-ligand coordination compounds may be present at, e.g., a concentration of at least about 0.25 M, at least about 0.35 M, at least about 0.5 M, at least about 0.75 M, at least about 1 M, at least about 1.25 M, at least about 1.5 M, at least about 2 M, or greater than 2 M, for example as high as 3 M, 4 M, or 5M.

The metal-ligand coordination compound may be further characterized with respect to the nature of the oxidizable or reducible species. For example, in some cases, the redox potential of the metal-ligand coordination compound may be defined by transitions entirely within the metal center—i.e., the redox potential is defined by the accessibility of and energies associated with transitions between various valence states within the metal. In other cases, the oxidation/reduction may be localized within the ligand system. In still other cases, the oxidation/reduction may be distributed throughout the entire redox active complex, such that both the metal and the ligand system sharing in the distribution of charge. Preferably, the redox potential should differ by at least 0.5 volt. More preferably, the redox potential should differ by at least 1.0 volt. It is suitable for each electrolyte to contain the same metal center, so long as the first metal center and second metal center have different oxidation states.

In particular embodiments of the present disclosure, the metal-ligand coordination compound may comprise ligands which are mono-, bi-, tri-, or multidentate. Monodentate ligands bind to metals through one atom, whereas bi-, tri-, or multidentate ligands bind to metals through 2, 3, or more atoms, respectively. Examples of monodentate ligands include halogens ($F^-$, $Cl^-$, $Br^-$, $I^-$), cyanide ($CN^-$), carbonyl or carbon monoxide (CO), nitride ($N^{3-}$), oxo ($O^{2-}$), hydroxo ($OH^-$), water ($H_2O$), sulfide ($S^{2-}$), pyridine, pyrazine, and the like. Other types of ligand bonding moieties include amino groups ($NR_3$), amido groups ($NR_2$), imido groups (NR), alkoxy groups (R—$CO^-$), siloxy (R—$SiO^-$), thiolate (R—$S^-$), and the like, which may comprise mono-, bi-, tri-, or multidentate ligands. Examples of bidentate ligands include catechol, bipyridine, bipyrazine, ethylenediamine, diols (including ethylene glycol), and the like. Examples of tridentate ligands include terpyridine, diethylenetriamine, triazacyclononane, trisaminomethane, and the like. Other acceptable ligands include quinones, hydroquinones, viologens, pyridinium, acridinium, polycyclic aromatic hydrocarbons and combinations thereof.

The disclosed systems and methods may feature electrochemical cell separators and/or membranes that have certain characteristics. In this disclosure, the terms membrane and separator are used interchangeably. The membranes of the present disclosure may, in some embodiments, feature a membrane separator having a thickness of about 500 microns or less, about 300 microns or less, about 250 microns or less, about 200 microns or less, about 100 microns or less, about 75 microns or less, about 50 microns or less, about 30 microns or less, about 25 microns or less, about 20 microns or less, about 15 microns or less, or about 10 microns or less, for example to about 5 microns, and where the phrase "100 microns or less" is used, separate embodiments include those using these ranges. Suitable separators include those separators in which the flow battery is capable of operating with a current efficiency of at least about 85% with a current density of 100 mA/cm² when the separator has a thickness of 100 microns or less. More preferably, the flow battery is capable of operating at a current efficiency of at least 99.5% when the separator has a thickness of about 50 microns or less, a current efficiency of at least 99% when the separator has a thickness of about 25 microns or less, and a current efficiency of at least 98% when the separator has a thickness of about 10 microns or less (e.g., to as low as 5 microns). Suitable separators include those separators in which the flow battery is capable of operating at a voltage efficiency of at least 60% with a current density of about 100 mA/cm². More preferably, Suitable separators include those separators in which the flow battery is capable of operating at a voltage efficiency of at least 70%, at least 80% or at least 90%.

Separators are generally categorized as either solid or porous. Solid membranes typically comprise an ion-exchange membrane, wherein an ionomer facilitates mobile ion transport through the body of the polymer. It is suitable for the ionomer to have an ionomer mass content on an areal basis of less than $2\times10^{-3}$ g ionomer/cm². The facility with which ions conduct through the membrane can be characterized by a resistance, typically an area resistance in units of $\Omega$ cm². The area resistance is a function of inherent membrane conductivity and the membrane thickness. Thin membranes are desirable to reduce inefficiencies incurred by ion conduction and therefore can serve to increase voltage efficiency of the energy storage device. Active material crossover rates are also a function of membrane thickness, and typically decrease with increasing membrane thickness. Crossover represents a current efficiency loss that is generally balanced with the voltage efficiency gains by utilizing a thin membrane. Suitable membranes include those membranes that have a permeation rate of about 0.05 mg/cm² or less for the active materials. The active material present in the first electrolyte may be present in the second electrolyte. Conversely, the second electrolyte present in the second electrolyte solution may be present in the first electrolyte solution. In each case, the concentration of either the first active material in the second electrolyte solution or the second active material in the first electrolyte solution should be about 1 mM or less. It is preferred that the first electrolyte substantially comprises the second active material and the second electrolyte is substantially free of the first active material. It will be apparent to one of ordinary skill in the art the meaning of "substantially free." The diffusion rate of the either the first or second active material should be about $1\times10^{-7}$ mol/cm²-sec or less, about $1\times10^{-9}$ mol/cm²-sec or less, about $1\times10^{-11}$ mol/cm²-sec or less, about $1\times10^{-13}$ mol/cm²-sec or less, or about $1\times10^{-15}$ mol/cm²-sec or less. Other embodiments of this invention include situations where the first electrolyte and second electrolyte are intermixed.

Porous membranes are non-conductive membranes which allow charge transfer between two electrodes via open channels filled with conductive electrolyte. Porous membranes are permeable to liquid or gaseous chemicals. This permeability increases the probability of chemicals passing through porous membrane from one electrode to another causing cross-contamination and/or reduction in cell energy efficiency. The degree of this cross-contamination depends on, among other features, the size (the effective diameter and channel length), and character (hydrophobicity/hydrophilicity) of the pores, the nature of the electrolyte, and the degree of wetting between the pores and the electrolyte. The pore size distribution is generally sufficient to substantially prevent the crossover of active materials between the two electrolyte solutions. Suitable porous membranes will have an average size distribution of between about 0.001 nm and 20 microns. Preferably, the average size distribution should be between about 0.001 nm and 100 nm. The size distribution of the pores in a porous membrane can be substantial. In other words, a porous membrane may contain a plurality of pores with a very small diameter (approximately less than 1 nm) and may contain a plurality of pores with a very large diameter (approximately greater than 10 microns). The larger pore sizes can lead to a higher amount of active material crossover. The ability for a porous membrane to substantially prevent the crossover of active materials will depend on the relative difference in size between the average pore size and the active material. For example, when the active material is a metal center in the form of a metal-ligand complex, the average diameter of the metal ligand complex is about 50% greater than the average pore size of the porous membrane. On the other hand, if the porous membrane has substantially uniform pore sizes, it is preferred that the average diameter of the metal ligand complex be about 20% larger than the average pore size of the porous membrane. Likewise, the average diameter of a metal ligand complex is increased when the metal-ligand complex is further coordinated with at least one water molecule. The diameter of the metal-ligand complex coordinated with at least one water molecule is generally considered to be the hydrodynamic diameter. In such a situation, the hydrodynamic diameter is generally at least about 35% greater than the average pore size. When the average pore size is substantially uniform, the hydrodynamic radius should be about 10% greater than the average pore size. One of ordinary skill in the art will understand the term "substantially uniform."

Suitable ion-exchange separators may also comprise membranes, which are sometimes referred to as polymer electrolyte membrane (PEM) or ion conductive membrane (ICM). Suitable membranes may comprise any suitable polymer, typically an ion exchange resin, for example comprising a polymeric anion or cation exchange membrane, or combination thereof. The mobile phase of such a membrane may comprise, and/or is responsible for the primary or preferential transport (during operation of the battery) of at least one mono-, di-, tri-, or higher valent cation and/or mono-, di-, tri-, or higher valent anion, other than protons or hydroxide ions. Suitable solid cationic exchange polymers include use of one or more of the following polymers: cross-linked halogenated alkylated compound with a polyamine, a cross-linked aromatic polysulfone type polymer with a polyamine, perfluoriniated hydrocarbon sulfonate ionomers, sulfonated poly ether ether ketone (sPEEK), sulfonated poly(phthalazinone ether ketone), sulfonated phenolphthalein poly(ether sulfone), sulfonated polyimides, sulfonated polyphosphazene, sulfonated polybenzimidazole, aromatic polymers containing a sulfonic acid group, sulfonated perfluorinated polymer, fluorinated ionomers with sulfonate groups, carboxylate groups, phosphate groups, boronate acid groups, polyaromatic ethers with sulfonate or carboxylate groups, poly(4-vinyl pyridine, poly(2-vinyl pyridine), poly(styrene-b-2-vinylpyridine), poly(vinyl pyrrolidine), poly(1-methyl-4-vinylpyridine), poly[(2,2'-m-phenylene)-5,5'-bibenzimidazole][poly(2,2'-(m-phenylene)-5,5'-bibenzimidazole], poly(2,5-benzimidazole), polyacrylate, polymethacrylate or combinations thereof. Suitable solid anionic exchange membranes include the use of one or more of the following polymers: polydiaryl dimethyl ammonium, poly(methacryloyloxyethyl triethylammonium), poly(diallylammonium), or combinations thereof.

Additionally, substantially non-fluorinated membranes that are modified with sulfonic acid groups (or cation exchanged sulfonate groups) may also be used. Such membranes include those with substantially aromatic backbones, e.g., poly-styrene, polyphenylene, bi-phenyl sulfone (BPSH), or thermoplastics such as polyetherketones or polyethersulfones.

Other examples of ion-exchange membranes comprise Nafion™ (112, 117, HP, XL, NR-212, or U5), Gore Select membranes, Flemion™, and Selemion™.

Battery-separator style porous membranes, may also be used. Because they contain no inherent ionic conduction capability, such membranes are typically impregnated with additives in order to function. These membranes are typically comprised of a mixture of a polymer, and inorganic filler, and open porosity. Suitable polymers include those chemically compatible with the electrolytes of the presently described systems, including high density polyethylene, polypropylene, polyvinylidene difluoride (PVDF), or polytetrafluoroethylene (PTFE). Suitable inorganic fillers include silicon carbide matrix material, titanium dioxide, silicon dioxide, zinc phosphide, and ceria and the structures may be supported internally with a substantially non-ionomeric structure, including mesh structures such as are known for this purpose in the art.

Membranes may also be comprised of polyesters, poly (ether-ketone-ether-ketone-ketone), poly(vinyl chloride), vinyl polymers, substituted vinyl polymers, alone or in combination of any previously described polymer.

Membranes may also comprise reinforcement materials for greater stability. Suitable reinforcement materials include nylon, cotton, polyesters, crystalline silica, crystalline titania, amorphous silica, amorphous titania, rubber, asbestos wood or combination thereof. The volume percent of a reinforcement material may be determined at a given membrane thickness by the following example. The reinforcement material percent is determined from equation (9):

$$\text{Desired thickness} = \text{starting membrane thickness}/(1-\text{reinforcement vol \%}) \quad (9)$$

For example, the membrane should contain about 33% reinforcement material by volume starting with a membrane of 10 microns with a desired thickness of 15 microns.

Suitable membranes also comprise continuous membranes. The continuous membranes comprise at least a material in a continuous or discontinuous structure and a filler material that is a continuous or discontinuous structure. Suitable materials in a continuous or discontinuous structure comprises one or more of polyethylene, polypropylene, poly(tetrafluoroethylene), poly(vinyl chloride), or a combination thereof. Suitable filler material in a continuous or discontinuous structure comprises one or more of nonwoven fibers or naturally occurring substances. Suitable nonwoven fibers comprises one or more of nylon, cotton, polyesters, crystalline silica, amorphous silica, amorphous titania, crystalline titania or a combination thereof. Suitable naturally occurring substances comprise one or more of rubber, asbestos, wood or combination thereof. The continuous membrane may also be porous. Suitable porosity is in the range of about 5 to about 75% volume fraction.

Suitable separators may also have a plurality of layers. For instance, a suitable separator comprises a layer capable of ionic conduction and at least one layer capable of selective ion transport. The layer capable of ionic conduction comprises at least one of either the first electrolyte or the second electrolyte imbibed in to the separator. The electrolyte solution, for example potassium chloride (KCl), becomes imbibed into the separator and does not substantially seep out from the polymer matrix. The desired areal resistance range for the imbibed separator is determined by equation (10):

$$R_{total}[\text{ohm-cm}^2] = K_{membrane}/10^{-6}\text{m} + (\text{porosity}_{sep}\hat{\ }1.5 * K_{electrolyte})/\text{thickness}_{sep} \quad (10)$$

where R is the resistance, $K_{membrane}$ is the conductivity of the membrane, $K_{electrolyte}$ is the conductivity of the electrolyte, $\text{porosity}_{sep}$ is the porosity of the separator and $\text{thickness}_{sep}$ is the thickness of the separator. Any inert electrolyte, such as NaCl, KCl or the like, is suitable. One of ordinary skill in the art will appreciate suitable inert electrolytes suitable for this purpose. The layer capable of selective ion transport comprises any of the above mentioned solid cationic polymers. Other layers are envisioned within the scope of this invention that may enhance or reduce properties such as conduction, strength, thickness, selectivity, permeability, or the like.

Suitable separators include those separators capable of providing a selectivity in a range bounded at the lower end by a value of about 50, about 100, about 200, about 500, about 1000, about 5000, or about 10,000 and at the upper end of about 1,000,000, about 100,000, about 10,000, or about 1000 for at least one mobile ion over the any present active material. Some independent embodiments include those where the separators are capable of providing a selectivity in a range of from about 50 to about 1000, from about 50 to about 500, from about 50 to about 300, from about 100 to about 200, from about 100 to about 500, and in a range of from about 50 to about 100. Other independent embodiments provide those where the separators are capable of providing a selectivity in a range of about 1 to about 6 orders of magnitude, about 2 to about 5 orders of magnitude, about 3 to about 5 orders of magnitude, or about 2 to about 4 orders of magnitude for at least one mobile ion over any present active material.

In either an on-load or off-load condition, there may exist a significant difference in the concentration of active material species in the positive and negative electrolytes in a region of a cell. Despite the presence of the separator, there always exists some finite flux of these species across it due to these concentrations differences since all separators exhibit some permeability. When these species cross over the separator, a loss of energy efficiency occurs since charged species are self-discharging through direct interaction, but also the potential for electrolyte regeneration exists if the battery employs different active material compounds. It is of interest to develop a flow battery chemistry and cell configuration whereby the losses due to diffusive crossover of active materials from either electrolyte to the other do not, in total, exceed 2% of the current in an on-load condition in charge or discharge mode, preferably < ("less than") 1%, and most preferably << ("much smaller than") 1% for the reasons provided above.

Suitable separators include those separators where the separator is capable of excluding at least about 98% of at least one of the active materials. Preferably, the separator is capable of excluding at least about 99.0% of at least one of the active materials, and at least about 99.5% of the active materials.

When constructing practical flow battery cells, the electrodes may slightly permeate the separator and result in electrical shorting in a region of a cell. This facilitates the direct exchange of electrons across those shorts, which represents another form of self-discharge leading to current efficiency loss. Flow battery design generally includes a desired combination of separator mechanical properties (i.e., strength), diffusion media properties, cell geometry, and cell mechanical loading. It is of interest to develop a flow battery chemistry and cell configuration whereby the losses due to electrical shorts, in total, exceed 2% of the current in an on-load condition in charge or discharge mode.

Suitable separators are separators which are characterized as having a conductivity of about 0.01 to about 0.02 S/cm for $Li^+$, $Na^+$, and/or $K^+$ and a conductivity of about 0.01 S/cm or less for $Cl^-$, $Br^-$, $I^-$, and/or $OH^-$.

In an on-load condition during charge or discharge in a region of a flow battery cell, ionic current must flow across the separator during the course of the operation. It is desired that most of the ionic current demand be carried by mobile ions provided by supporting species in the electrolyte. However, if the active materials are ionically charged they may participate in carrying some portion of the ionic current demand, which depends on their transference. Significant transference of active materials occurs during the course of charge or discharge represents yet another form of self-discharge leading to current efficiency losses. It is of interest to develop a flow battery chemistry and cell configuration whereby the transference of active materials from either electrolyte to the other do not, in total, exceed 2% of the current in an on-load condition in charge or discharge mode, preferably <1%, and most preferably <<1% for the reasons provided above.

A portion of the cell geometry may contain an active area. It is desirable for at least a portion of the active area to be comprised of channels. The channels are largely open to the flow of electrolytes and portions of an electrically conductive plate material that electrically connects the electrodes either directly or through diffusion media. Conversely, it is suitable for the active area to be substantially formed of a region that is permeable to the flow of either the first electrolyte or second electrolyte, and whose volume is comprised partially of a high surface area, electrically conducting media.

A suitable flow battery is capable of a cell mechanical loading being able to withstand a mechanical load in the range of about 1 to about 1000 psi. Preferably, the flow battery is capable of withstanding a mechanical load of in the range of about 3 to about 500 psi, and more preferably between about 5 to about 100 psi.

In an on-load condition during charge or discharge in a flow battery cell, there may exist the potential for the current to be consumed in undesirable side reactions. Such side reactions include corrosion of cell materials, decomposition of the active material structure, or decomposition of the electrolyte. This is especially true where significant non-uniformities in concentration, voltage, or current density exist across the cell area. It is of interest to develop a flow battery chemistry and cell configuration whereby the current lost in parasitic reactions does not, in total, exceed 4% of the current in an on-load condition in charge or discharge mode, preferably <2%, and most preferably <1% for the reasons provided above.

Flow batteries are comprised of cells stacked in a bipolar configuration whereby the active materials are fed to either or both the positive and negative electrolyte chambers through common manifolds. Since these electrolytes are ionically conductive, their presence in a common manifold results in positive ionic current being driven from cells towards the positive end of the stack to those towards the negative end. This process will occur in both the positive and negative electrolyte manifolds, and will represent yet another form of self-discharge and current efficiency loss. It is of interest to develop a flow battery chemistry and cell/stack configuration whereby the current losses represented by shunt currents do not, in total, exceed 5% of the current in an on-load condition in charge or discharge mode, preferably <3%, and most preferably <2% for the reasons provided above.

The open circuit potential (OCV) of an electrochemical cell is a relevant operating characteristic of electrochemical energy storage systems. In certain embodiments, the OCV may be comparatively large (e.g. at least 1 V, and upwards of 2 V, 3 V, or 4 V). Such comparatively large open circuit potentials are known to enable high cell voltage efficiencies, high DC-DC conversion efficiencies, high energy storage densities, and low system costs. Traditional flow batteries with aqueous electrolytes and soluble active materials may operate with an OCV less than about 1.2 V. An electrochemical cell according to the present disclosure is suitably characterized by an open circuit potential of at least about 1.4 V.

In some embodiments, the open circuit voltage (OCV) of the flow battery is at least about 1.2 volts, at least about 1.3 V, at least about 1.4 V, at least about 1.5 V, at least about 1.6

V, at least about 1.7 V, at least about 1.8 V, at least about 1.9 V, or at least about 2 V. As described above, higher open circuit voltages are associated with higher power densities.

Systems and methods according to the present disclosure may exhibit a particular current density at a given round trip voltage efficiency. Methods for determining current density at a given round trip voltage efficiency are known to those skilled in the art of electrochemistry and electrochemical energy storage.

To serve as a metric for electrochemical cell performance, a specified current density is generally linked to a measured voltage efficiency. Higher current densities for a given round trip voltage efficiency enable lower cost electrochemical cells and cell stacks. In certain embodiments, it is desired to operate a flow battery with a current density of at least about 50 mA/cm$^2$ at $V_{EFF,RT}$ of at least about 50%. In other embodiments, the current density will be at least about 50 mA/cm$^2$ at $V_{EFF,RT}$ at least about 60%, at least about 75%, at least about 85%, at least about 90%. In other embodiments, the current density will be at least 100 mA/cm$^2$ at $V_{EFF,RT}$ of at least about 50%, at least about 60%, at least about 75%, at least about 85%, at least about 90% and the like. In other embodiments, the current density will be at least 200 mA/cm$^2$ at $V_{EFF,RT}$ of at least about 50%, at least about 60%, at least about 75%, at least about 85%, or at least about 90%. In certain embodiments, these efficiencies may be achieved when the current density is in a range having a lower limit of from about 50 mA/cm$^2$, about 100 mA/cm$^2$ or about 200 mA/cm$^2$ and an upper limit of about 200 mA/cm$^2$, about 300 mA/cm$^2$, about 400 mA/cm$^2$, or about 500 mA/cm$^2$.

Electrolytes that include an organic active material, either in the absence or presence of metal coordination, are considered suitable for one or both half-cells of the disclosed systems and methods. Suitable organic active materials include carbon, aromatic hydrocarbons, including quinones, hydroquinones, viologens, pyridinium, pyridine, acridinium, catechol, other polycyclic aromatic hydrocarbons, and the like. Suitable organic active materials may also include sulfur, including thiol, sulfide, and disulfide moieties. Suitable organic active materials may be soluble in water in concentrations at least about 0.1 M, at least about 0.5 M, at least about 1 M, at least about 1.5 M, or at least about 2 M. Separate embodiments provide ranges in which the upper levels of concentrations are about 5 M, about 4 M, about 3 M, about 2.5 M, or about 2 M. Higher concentrations are preferred for yielding higher system energy densities.

The disclosed systems and methods may also be characterized in terms of their half-cell potentials. Both the negative and positive electrode may exhibit a half-cell potential. An electrochemical cell according to the present disclosure may, in some embodiments, have a half-cell potential for the negative electrode less than about 0.5 V vs. RHE, less than about 0.2 V vs. RHE, less than about 0.1 V vs. RHE, less than about 0.0 V vs. RHE, less than about −0.1 V vs. RHE, less than about −0.2 V vs. RHE, less than about −0.3 V vs. RHE, less than about −0.5 V vs. RHE, for example, to about −2 V vs. RHE. An electrochemical cell according to the present disclosure may, in some embodiments, have a half-cell potential for the positive electrode at least about 0.5 V vs. RHE, at least about 0.7 V vs. RHE, at least about 0.85 V vs. RHE, at least about 1.0 V vs. RHE, at least about 1.1 V vs. RHE, at least about 1.2 V vs. RHE, at least about 1.3 V vs. RHE, at least about 1.4 V vs. RHE and the like, for example, to about 2 V vs. RHE.

The disclosed systems and methods may also be characterized in terms of their energy density, as defined above. Flow batteries of the present disclosure may operate with an energy density of about 5 Wh/L, between about 5 Wh/L and about 15 Wh/L, between about 10 Wh/L and about 20 Wh/L, between about 20 Wh/L and about 30 Wh/L, between about 30 and about 40 Wh/L, between about 25 Wh/L and about 45 Wh/L, and above 45 Wh/L, for example to about 50 Wh/L, to about 60 Wh/L, or to about 70 Wh/L.

Among the many specific embodiments considered within the scope of the present invention are these:

Embodiment 1

A flow battery, comprising:
a first electrolyte comprising an aqueous solution comprising a first active material containing at least one mobile ion;
a second electrolyte comprising an aqueous solution comprising a second active material and at least one mobile ion;
a first electrode in contact with said first aqueous electrolyte;
a second electrode in contact with said second aqueous electrolyte; and
a separator;
wherein the flow battery is capable of operating with a current efficiency at least about 85% with a current density of at least about 100 mA/cm$^2$ and wherein the separator has a thickness of about 100 microns or less.

Embodiment 2

The flow battery of Embodiment 1, wherein a region of a cell in a flow battery in an on- or off-load condition that is substantially filled with positive and negative electrolytes, wherein the diffusive crossover of active materials represents 2% or less current efficiency loss in an on-load condition in charge or discharge mode.

Embodiment 3

The flow battery of Embodiment 1 or 2, wherein a region of a cell in a flow battery in an on- or off-load condition that is substantially filled with positive and negative electrolytes, wherein electrical shorts present in the cell between positive and negative electrodes account for less than or equal to 2% current efficiency loss in an on-load condition in charge or discharge mode.

Embodiment 4

The flow battery of any one of Embodiments 1 to 3, wherein a region of a cell in a flow battery in an on- or off-load condition that is substantially filled with positive and negative electrolytes, wherein the transference of the charged active materials between positive and negative electrolytes represents about 2% or less current efficiency loss in an on-load condition in charge or discharge mode.

Embodiment 5

The flow battery of any one of Embodiments 1 to 4, wherein a region of a cell in a flow battery in an on- or off-load condition that is substantially filled with positive and negative electrolytes, wherein an amount of current that is diverted to parasitic reactions represents about 4% or less current efficiency loss in an on-load condition in charge or discharge mode.

Embodiment 6

The flow battery of any one of Embodiments 1 to 5, wherein a region of a cell in a flow battery in an on- or off-load condition that is substantially filled with positive and negative electrolytes, wherein shunt currents that develop in the fluidic manifolds represent about 5% or less current efficiency losses in an on-load condition in charge or discharge mode.

Embodiment 7

The flow battery of any one of Embodiments 1 to 6, wherein the first and second active materials are metal ligand coordination compounds.

Embodiment 8

The flow battery of Embodiment 7, wherein the metal ligand coordination compound comprises a ligand comprising one or more of the following: CN—, $H_2O$, halo, hydroxyl, amines, polyamines, polyalcohols, anions of carboxylic acids, dicarboxylic acids, polycarboxylic acids, amino acids, carbonyl or carbon monoxide carbonyl or carbon monoxide, nitride, oxo, sulfide, pyridine, pyrazine, amido groups, imido groups, alkoxy groups, siloxy, thiolate, catechol, bipyridine, bipyrazine, ethylenediamine, diols, terpyridine, diethylenetriamine, triazacyclononane, trisaminomethane, quinones, hydroquinones, viologens, pyridinium, acridinium, polycyclic aromatic hydrocarbons or combination thereof.

Embodiment 9

The flow battery of any one of Embodiments 1 to 8, wherein the metal of the first metal ligand coordination compound comprises one or more of the following atoms: Al, Ca, Co, Cr, Cu, Fe, Mg, Mn, Mo, Ni, Pd, Pt, Ru, Sn, Ti, V, Zn, Zr, or a combination thereof.

Embodiment 10

The flow battery of any one of Embodiments 1 to 9, wherein the metal of the first metal ligand coordination compound comprises one or more of the following atoms: Al, Ca, Co, Cr, Fe, Mg, Ti, V, Zn, Zr, or a combination thereof.

Embodiment 11

The flow battery of any one of Embodiments 1 to 10, wherein the metal of the second metal ligand coordination compound comprises one or more of the following atoms: Al, Ca, Co, Cr, Cu, Fe, Mg, Mn, Mo, Ni, Pd, Pt, Ru, Sn, Ti, V, Zn, Zr, or a combination thereof.

Embodiment 12

The flow battery of Embodiment 11, wherein the metal of the second metal ligand coordination compound comprises one or more of the following atoms: Al, Ca, Co, Cr, Fe, Mg, Ti, V, Zn, Zr, or a combination thereof.

Embodiment 13

The flow battery of any one of Embodiments 1 to 12, wherein the metal of the first metal ligand coordination compound and the metal of the second metal ligand coordination compound differ in reduction potential by at least about 0.5 volts.

Embodiment 14

The flow battery of any one of Embodiments 1 to 13, wherein the metal of the first metal ligand coordination compound and the metal of the second metal ligand coordination compound differ in reduction potential by at least about 1.0 volt.

Embodiment 15

The flow battery of any one of Embodiments 1 to 14, wherein the metal of the first metal ligand coordination compound is the same as the second metal ligand coordination compound; and wherein the first metal and second metal have different oxidation states.

Embodiment 16

The flow battery of any one of Embodiments 1 to 15, wherein the second active material is different from the first active material.

Embodiment 17

The flow battery of any one of Embodiments 1 to 16, wherein the mobile ion carries at least about 80% of the ionic current during charge/discharge.

Embodiment 18

The flow battery of any one of Embodiments 1 to 17, wherein the mobile ion carries at least about 85% of the ionic current during charge/discharge.

Embodiment 19

The flow battery of any one of Embodiments 1 to 18, wherein the mobile ion comprises one or more of the following: Li+, K+, Na+, $Mg^{2+}$, $Ca^{2+}$, $Sr^{2+}$, Cl$^-$, Br$^-$, I$^-$, OH$^-$ or a combination thereof.

Embodiment 20

The flow battery of any one of Embodiments 1 to 19, wherein the separator has a thickness of about 50 microns or less and the flow battery operates at at least about 98% current efficiency.

Embodiment 21

The flow battery of any one of Embodiments 1 to 20, wherein the separator has a thickness of 25 microns or less and the flow battery operates at at least about 96% current efficiency.

Embodiment 22

The flow battery of any one of Embodiments 1 to 21, wherein the flow battery is capable of operating with shorting losses of about 1 mA/cm² or less, about 0.5 mA/cm² or less, or about 0.01 mA/cm² or less.

Embodiment 23

The flow battery of any one of Embodiments 1 to 22, wherein the separator comprises a polymer, wherein the polymer is a cationic exchange membrane comprised of anionic functional groups.

Embodiment 24

The flow battery of Embodiment 23, wherein the polymer comprises one or more of the following: cross-linked halogenated alkylated compound with a polyamine, a cross-linked aromatic polysulfone type polymer with a polyamine, perfluoriniated hydrocarbon sulfonate ionomers, sulfonated polyetherether ketone (sPEEK), sulfonated poly(phthalazinone ether ketone), sulfonated phenolphthalein poly(ether sulfone), sulfonated polyimides, sulfonated polyphosphazene, sulfonated polybenzimidazole, aromatic polymers containing a sulfonic acid group, sulfonated perfluorinated polymer, fluorinated ionomers with sulfonate groups, carboxylate groups, phosphate groups, boronate acid groups, or combinations thereof, polyaromatic ethers with sulfonate or carboxylate groups, poly(4-vinyl pyridine, poly(2-vinyl pyridine), poly(styrene-b-2-vinylpyridine), poly(vinyl pyrrolidine), poly(1-methyl-4-vinylpyridine), poly[(2,2'-m-phenylene)-5,5'-bibenzimidazole][poly(2,2'-(m-phenylene)-5,5'-bibenzimidazole], poly(2,5-benzimidazole), polyacrylate, polymethacrylate or combinations thereof.

Embodiment 25

The flow battery of any one of Embodiments 1 to 24, wherein the separator comprises a solid polymer, wherein the solid polymer is an anionic exchange membrane comprised of cationic functional groups.

Embodiment 26

The flow battery of Embodiment 25, wherein the polymer comprises one or more of the following: polydiaryldimethylammonium, poly(methacryloyloxyethyltriethylammonium), poly(diallylammonium), or combinations thereof.

Embodiment 27

The flow battery of any one of Embodiments 1 to 26, wherein the polymer comprises one or more of the following: polytetrafluoroethylene, polyvinyl, polystyrene, polyethylene, polypropylene, polyesters, perfluoriniated polymers, polyvinylidene fluoride, poly(ether-ketone-ether-ketone-ketone), poly(vinyl chloride), substituted vinyl polymers, polystyrene, or combinations thereof.

Embodiment 28

The flow battery of Embodiment 27, wherein the membrane further comprises a reinforcement material.

Embodiment 29

The flow battery of Embodiment 28, wherein the reinforcement material comprises one or more of the following: nylon, cotton, polyesters, crystalline silica, crystalline titania, amorphous silica, amorphous titania, rubber, asbestos wood or combination thereof.

Embodiment 30

The flow battery of Embodiment 29, wherein a volume percent of reinforcement is determined at a given membrane thickness by: desired thickness=10 μm/(1−reinforcement vol %).

Embodiment 31

A flow battery, comprising:
a first electrolyte comprising an aqueous solution comprising a first active material containing at least one mobile ion;
a second electrolyte comprising an aqueous solution comprising a second active material and at least one mobile ion;
a first electrode in contact with said first aqueous electrolyte;
a second electrode in contact with said second aqueous electrolyte; and
a separator having a thickness of about 100 microns or less;
wherein the flow battery is capable of operating with a round trip voltage efficiency of at least about 60% with a current density of at least about 100 mA/cm².

Embodiment 32

The flow battery of Embodiment 31, wherein the flow batter is capable of operating with a voltage efficiency of at least 60%, of at least 70%, of at least 80%, or of at least 90%.

Embodiment 33

The flow battery of any one of Embodiments 31 to 32, wherein the second active material being different from the first active material.

Embodiment 34

A flow battery, comprising:
a first electrolyte comprising an aqueous solution comprising a first active material containing at least one mobile ion;
a second electrolyte comprising an aqueous solution comprising a second active material and at least one mobile ion;
a first electrode in contact with said first aqueous electrolyte;
a second electrode in contact with said second aqueous electrolyte; and
a separator of thickness about 100 microns or less and capable of having a selectivity in a range of from about 50 to about 1,000,000 for one mobile ion over the first and second active materials.

Embodiment 35

The flow battery of Embodiment 34, wherein the separator is capable of having a selectivity in a range of about 50 to about 200 for at least one mobile ion over the first and second active materials.

Embodiment 36

The flow battery of Embodiment 35, wherein the separator is capable of having a selectivity in a range of from 100 to about 1000 for at least one mobile ion over the first and second active centers.

Embodiment 37

The flow battery of any one of Embodiments 34 to 36, wherein the second active material being different from the first active material.

Embodiment 38

A flow battery, comprising:
a first electrolyte comprising an aqueous solution comprising a first active material containing at least one mobile ion;
a second electrolyte comprising an aqueous solution comprising a second active material and at least one mobile ion;
a first electrode in contact with said first aqueous electrolyte;
a second electrode in contact with said second aqueous electrolyte; and
a separator having a thickness of about 100 microns or less and capable of giving rise to diffusion rates through the separator for the first active material, the second active material, or both, to be about $1\times10^{-7}$ mol/cm$^2$-sec or less.

Embodiment 39

The flow battery of Embodiment 38, wherein the first active material, the second active material, or both, have a diffusion rate through the separator of about $1\times10^{-9}$ mol/cm$^2$-sec or less, about $1\times10^{-11}$ mol/cm$^2$-sec or less, about $1\times10^{-13}$ mol/cm$^2$-sec or less, or about $1\times10^{-15}$ mol/cm$^2$-sec or less.

Embodiment 40

The flow battery of Embodiment 38 or 39, wherein the second active material being different from the first active material.

Embodiment 41

The flow battery of one of Embodiments 1 to 40, wherein the separator comprises a porous membrane.

Embodiment 42

The flow battery of Embodiment 41, wherein the separator is a porous membrane and wherein the porous membrane has pores with an average size distribution of between about 0.001 nm and 100 nm.

Embodiment 43

The flow battery of Embodiment 41 or 42, wherein the active materials are substantially in the form of a metal-ligand coordination compounds and the average diameter of the metal-ligand coordination compound is about 50% greater than the average pore size of the porous membrane.

Embodiment 44

The flow battery of any one of Embodiments 41 to 43, wherein the active materials are substantially in the form of a metal-ligand coordination compounds and the average diameter of the metal-ligand coordination compounds are about 20% larger than the average pore size of the porous membrane when the pore size range is substantially uniform.

Embodiment 45

The flow battery of any one of Embodiments 1 to 44, wherein
the active materials are substantially in the form of a metal-ligand coordination compounds;
the metal-ligand coordination compound has a hydration sphere such that the metal-ligand coordination compound is characterized as having a hydrodynamic diameter; and
the hydrodynamic diameter is about 35% larger than the average pore size of the porous membrane.

Embodiment 46

The flow battery of any one of Embodiments 1 to 44, wherein the active materials are substantially in the form of a metal-ligand coordination compounds;
metal-ligand coordination compounds is further coordinated to at least one water molecule giving rise to a hydrodynamic diameter; and
the hydrodynamic diameter is about 10% larger than the average pore size of the porous membrane when the pore size range is substantially uniform.

Embodiment 47

A flow battery, comprising: a first electrolyte comprising an
aqueous solution comprising a first active material containing at least one mobile ion;
wherein the first active material has a net ionic charge;
a second electrolyte comprising an aqueous solution comprising a second active material and at least one mobile ion;
wherein the second active material has a net ionic charge;
a first electrode in contact with said first aqueous electrolyte;
a second electrode in contact with said second aqueous electrolyte; and
a separator of thickness of about 100 microns or less, the separator comprising an ionomer membrane;
wherein the net ionic charge of the first, second, or both active materials matches that of the ionomer membrane; and
wherein the flow battery is capable of operating with a current efficiency of at least about 90% with a current density of at least about 100 mA/cm$^2$.

Embodiment 48

The Embodiment of 47, wherein the ionomer has an ionomer mass to molar content on an areal basis of about $2\times10^{-3}$ g ionomer/cm$^2$ or less.

Embodiment 49

A flow battery, comprising:
a first electrolyte comprising an aqueous solution comprising a first active material containing at least one mobile ion;
a second electrolyte comprising an aqueous solution comprising a second active material and at least one mobile ion;

a first electrode in contact with said first aqueous electrolyte;

a second electrode in contact with said second aqueous electrolyte; and a separator of thickness of about 100 microns or less, wherein the separator has a plurality of layers wherein at least one layer is capable of ionic conduction and at least one other layer is capable of selective ion transport; and wherein the flow battery is capable of operating with a current efficiency of at least about 90% with a current density of at least about 100 mA/cm$^2$.

Embodiment 50

The flow battery of Embodiment 49, wherein the at least one layer comprises at least one of the first electrolyte or the second electrolyte to be imbibed onto the separator.

Embodiment 51

The flow battery of Embodiment 49 or 50, wherein a desired areal resistance range for the imbibed separator is determined by $R_{total}[\text{ohm-cm}^2] = K_{membrane}/10^{-6}$ m+ (porosity$_{sep}$^1.5*K$_{electrolyte}$)/thickness$_{sep}$.

Embodiment 52

The flow battery of any one of Embodiments 49 to 51, wherein the at least one other layer capable of selective ion transport comprises one or more of the following: perfluorinated sulfonate polymer, perfluoriniated hydrocarbon sulfonate ionomers, sulfonated polyetherether ketone (sPEEK), sulfonated poly(phthalazinone ether ketone), sulfonated phenolphthalein poly(ether sulfone), sulfonated polyimides, sulfonated polyphosphazene, sulfonated polybenzimidazole, polyaromatic ethers with sulfonic or carboxylic acid groups, or combinations thereof.

Embodiment 53

The flow battery of any one of Embodiments 49 to 52, wherein at least one layer of the plurality of layers is a porous membrane.

EXAMPLES

The following Examples are provided to illustrate some of the concepts described within this disclosure. While each Example is considered to provide specific individual embodiments of composition, methods of preparation and use, none of the Examples should be considered to limit the more general embodiments described herein.

Example 1

Example 1.1—Materials

Sodium hexacyanoferrate(II) decahydrate 99%, Na$_4$Fe(CN)$_6$.10H$_2$O; potassium hexacyanoferrate(II) trihydrate 98+%, K$_4$Fe(CN)$_6$.3H$_2$O; potassium hexacyanoferrate(III) ACS 99.0% min; K$_3$Fe(CN)$_6$; ethylene glycol, propylene glycol, glycerol, lactic acid (80-85% aqueous solution); glycine, glycolic acid (67% aqueous solution); maleic acid; malic acid; phthalic acid; salicylic acid; gluconic acid; citric acid; sarcosine; iron (III) sulfate; iron (III) chloride; titanium oxysulfate; manganese (II) sulfate; and chromium (III) sulfate were purchased from Alfa Aesar (Ward Hill, Mass.) as ACS grade or better unless specified above and were used without additional purification. Ammonium bislactatobishydroxytitanium (IV) was purchased from Sigma Aldrich (St. Louis, Mo.) as a 50% aq. solution and was used without further purification. Potassium hexacyanochromate(III), K$_3$[Cr(CN)$_6$] and potassium hexacyanomanganate(III), K$_3$[Mn(CN)$_6$] were purchased from Sigma-Aldrich (St. Louis, Mo.) and used without additional purification.

Complexes could be synthesized by several methods. Homoleptic tris-ligated complexes were most easily synthesized by stirring a 3:1 aqueous mixture of ligand and metal salt while slowly adding an alkali metal hydroxide solution until the pH was between 8 and 13, the typical window of stability for the complexes of interest. Certain mixed ligand species, for example Ti(lactate)$_2$(salicylate), could also be synthesized by this method.

Mono and bis α-hydroxy acid complexes of iron and titanium were synthesized by the portion-wise addition of 2 equivalents of sodium bicarbonate to stirred solutions of the metal sulfates (2-3 M) and the appropriate proportion of the appropriate ligand. For example, 6 mmol of TiOSO$_4$ and 6 mmol of glycolic acid were stirred, and 12 mmol of NaHCO$_3$ was added slowly, allowing gas evolution to subside between additions. The pH of the resulting solutions was about 3.5 for the solutions of ML$_1$ and about 2 for the solutions of ML$_2$. The solubility of these complexes relative to aquated metals is evidenced by the stability with respect to precipitation of metal oxides of TiL$_1$ and TiL$_2$ solutions at such high pHs. In a control experiment where no ligand was added, wholesale and irreversible precipitation of TiO$_2$ was observed when more than 1 equivalent of NaHCO$_3$ was added, corresponding to a pH of about 1.

Complexes with additional ligands could be synthesized by adding an appropriate amount of ML$_1$ or ML$_2$ solution synthesized as described in the previous paragraph to a solution of the desired additional ligand mixed with a suitable base, such as potassium carbonate or potassium hydroxide. Mixed ligand analogs of the Mn, Cr, Ti, and Fe compounds may be prepared by similar reaction schemes.

Titanium bis-lactate L' complexes could also be synthesized using (NH$_4$)$_2$Ti(lactate)$_2$(OH)$_2$ (available from Sigma Aldrich as a 50% solution) as a synthon. In this case, L' (e.g., salicylic acid) was added, and after about an hour of stirring, an aqueous solution of 2 eq. alkali metal hydroxide was added to deprotonate ammonium, drive off ammonia over the course of about 24 hours of stirring uncapped in a fume hood, and provide the desired metal complex as a sodium/potassium salt, e.g., NaKTi(lactate)$_2$(salicylate).

Disodium titanium(IV) triscatecholate, Na$_2$Ti(catecholate)$_3$ was synthesized by a modification of a procedure described by Davies, see Davies, J. A.; Dutramez, S. *J. Am. Ceram. Soc.* 1990, 73. 2570-2572, from titanium(IV) oxysulfate and pyrocatechol. Sodium hydroxide was used in place of ammonium hydroxide to obtain the sodium salt. Sodium potassium titanium(IV) trispyrogallate, NaKTi(pyrogallate)$_3$ was made analogously, first as the ammonium salt, (NH$_4$)Ti(pyrogallate)$_3$, and subsequently converted to the sodium potassium salt by heating in a mixture of aqueous sodium hydroxide and aqueous potassium hydroxide.

The mixed ligand titanium complexes sodium potassium titanium(IV) biscatecholate monopyrogallate, sodium potassium titanium(IV) biscatecholate-monolactate, sodium potassium titanium (IV) biscatecholate monogluconate, sodium potassium titanium(IV) biscatecholate monoascorbate, and sodium potassium titanium(IV) bis catecholate monocitrate were made from a titanium catecholate dimer, $Na_2K_2[TiO(catecholate)]_2$. For the synthesis of the tetrapotassium salt see Borgias, B. A.; Cooper, S. R.; Koh, Y. B.; Raymond, K. N. *Inorg. Chem.* 1984, 23, 1009-1016. A one-to-one mixture of titanium dimer with the desired chelate (pyrogallol, lactic acid, gluconic acid, ascorbic acid, or citric acid) gave the mixed ligand species. Sodium potassium titanium(IV) monocatecholate monopyrogallate monolactate was made in a similar fashion by addition of both pyrogallol and lactic acid to the catecholate containing dimer. Mixed ligand analogs of the Al, Cr, Fe, and Mn compounds may be prepared by similar reaction schemes. Mixed ligand analogs of the Al, Cr, Fe, and Mn compounds may be prepared by similar reaction schemes.

Sodium potassium iron(III) triscatecholate, $Na_{1.5}K_{1.5}Fe(catecholate)_3$ was prepared according to the procedure outline by Raymond et. al., see Raymond, K. N.; Isied, S. S., Brown, L. D.; Fronczek, F. R.; Nibert, J. H. *J. Am. Chem. Soc.* 1976, 98, 1767-1774. The only modification was the use of a mixture of sodium hydroxide and potassium hydroxide as the excess base in place of potassium hydroxide.

Sodium titanium(IV) triscitrate, $Na_4Ti(citrate)_3$, was synthesized by analogy to the method used for sodium titanium (IV) triscatecholate described above except using citric acid in place of catechol. These starting materials were obtained from Alfa Aesar (Ward Hill, Mass.), were of reagent grade or better, and were used as received.

Sodium aluminum(III) biscitrate monocatecholate, $Al(citrate)_2(catecholate)$, was synthesized in analogy to the method used for sodium titanium(IV) triscatecholate described above except using two equivalents of citric acid and one equivalent of catechol to a solution of aluminum (III) sulfate. These starting materials were obtained from Alfa Aesar (Ward Hill, Mass.), were of reagent grade or better, and were used as received.

Example 1.2—Cyclic Voltammetry

Cyclic voltammetry data was recorded using a 760c potentiostat (CH Instruments, Austin, Tex.) with iR correction. Tests were conducted using glassy carbon working electrodes (Bioanalytical Systems, Inc., West Lafayette, Ind.), Ag/AgCl reference electrodes (Bioanalytical Systems, Inc. West Lafayette, Ind.) and platinum wire counter electrodes (Alfa Aesar, Ward Hill, Mass.). Working electrodes were polished according to the supplier's instructions before each experiment. Reference electrodes were calibrated against a "master" Ag/AgCl electrode known to have a potential of +0.210 V vs. NHE as known by those skilled in the art of electrochemistry. Solutions were sparged with argon for at least 5 minutes before each experiment. All experiments were performed at ambient temperatures (17-22° C.). No supporting electrolytes were added unless otherwise specified. All data were collected at a scan rate of 100 mV/s unless otherwise specified. Under these conditions, hydrogen evolution became significant at potentials more negative than −0.80 V vs. RHE and oxygen evolution became significant at potentials more positive than +2.20 V vs. RHE. Representative electrochemical data are provided in the following Tables.

TABLE 2A

Exemplary electrochemical couples described herein; half-cell potentials generated by cyclic votammetry, using glassy carbon electrodes

| Couple | $E_{1/2}$, V vs. RHE | pH | Solubility (Molar), 25° C. | Charge Density (Ah/L) |
|---|---|---|---|---|
| $Al(citrate)_2(catecholate)^{2-/3-}$ | 1.25 | 11.5 | 0.5 | 13.4 |
| $Fe(catecholate)_3^{2-/3-}$ | −0.50 | 11 | 1.5 | 40.2 |
| $Ti(catecholate)_3^{2-/3-}$ | −0.45 | 11 | 1.0 | 26.8 |
| $Ti(pyrogallate)_3^{2-/3-}$ | −0.55 | 9.8 | 1.6 | 42.9 |
| $Ti(catecholate)_2(pyrogallate)^{2-/3-}$ | −0.50 | 11 | 1.5 | 40.2 |
| $Ti(catecholate)_2(ascorbate)^{2-/3-}$ | −0.55 | 10 | 1.5 | 40.2 |
| $Ti(catecholate)_2(gluconate)^{2-/3-}$ | −0.60 | 9 | 1.5 | 40.2 |
| $Ti(catecholate)_2(lactate)^{2-/3-}$ | −0.49 | 9 | 1.5 | 40.2 |
| $Ti(catecholate)(pyrogallate)(lactate)^{2-/3-}$ | −0.70 | 8.5 | 1.5 | 40.2 |
| $Ti(citrate)_3$ | −0.04 | 5 | 2.0 | 53.6 |
| $Fe(CN)_6^{3-/4-}$ | 1.18 | 11 | 1.5 | 40.2 |
| $Cr(CN)_6^{3-/4-}$ | −0.60 | 9 | 1.5 | 40.2 |
| $Mn(CN)_6^{3-/4-}$ | −0.60 | 9 | 1.5 | 40.2 |

TABLE 2B

Exemplary electrochemical couples described herein

| Couple | $E_{1/2}$, V vs. RHE | pH | Solubility (Molar), 25° C. | Charge Density (Ah/L) |
|---|---|---|---|---|
| $Ti^{IV/III}(lactate)_1$ | −0.34 | 3.6 | 1.75 | 46.9 |
| $Ti^{IV/III}(lactate)_1$ | −0.40 | 5.6 | 1.75 | 46.9 |
| $Ti^{IV/III}(lactate)_1$ | −0.54 | 9 | 1.75 | 46.9 |
| $Ti^{IV/III}(lactate)_2$ | −0.03 | 2 | 1.75 | 46.9 |
| $Ti^{IV/III}(lactate)_2$ | −0.40 | 3.6 | 1.75 | 46.9 |
| $Ti^{IV/III}(lactate)_2$ | −0.40 | 9 | 1.75 | 46.9 |
| $Ti^{IV/III}(lactate)_1(malate)_2$ | −0.40 | 9.9 | 1.5 | 40.2 |
| $Ti^{IV/III}(malate)_2(salicylate)$ | −0.48 | 10 | 1.5 | 40.2 |
| $Ti^{IV/III}(lactate)_2(glycinate)$ | −0.50 | 9.9 | 1.5 | 40.2 |
| $Ti^{IV/III}(lactate)_2(salicylate)$ | −0.48 | 10 | 1.5 | 40.2 |
| $Ti^{IV/III}(salicylate)_2(lactate)$ | −0.50 | 9.8 | 1.5 | 40.2 |
| $Ti^{IV/III}(\alpha\text{-hydroxyacetate})_2(salicylate)$ | −0.48 | 10 | 1.5 | 40.2 |
| $Ti^{IV/III}(malate)_2(salicylate)$ | −0.50 | 10 | 1.5 | 40.2 |
| $Ti^{IV/III}(\alpha\text{-hydroxyacetate})_2(lactate)$ | −0.50 | 10 | 1.5 | 40.2 |
| $Ti^{IV/III}(lactate)_2(\alpha\text{-hydroxyacetate})$ | −0.50 | 10 | 1.5 | 40.2 |
| $Ti^{IV/III}(lactate)_3$ | −0.45 | 10 | 1.75 | 46.9 |
| $Ti^{IV/III}(salicylate)_3$ | −0.25 | 8.6 | 0.5 | 13.4 |
| $Fe^{III/II}(salicylate)_3$ | −0.10 | 9.3 | 0.5 | 13.4 |
| $Fe^{III/II}(malate)_3$ | −0.30 | 9.2 | 1.0 | 26.8 |
| $Fe^{III/II}(\alpha\text{-hydroxyacetate})_3$ | −0.50 | 8.1 | 1.0 | 26.8 |
| $Fe^{III/II}(lactate)_2(salicylate)_1$ | −0.39 | 8.7 | 1.0 | 26.8 |
| $Fe^{III/II}(lactate)_2(glycinate)_1$ | +0.30 | 6.7 | 1.0 | 26.8 |
| $Fe^{III/II}(lactate)_2$ | +0.45 | 2.6 | 1.5 | 40.2 |
| $Fe^{III/II}(lactate)_1$ | +0.11 | 3.1 | 1.5 | 40.2 |
| $Fe(CN)_6^{3-/4-}$ | +1.18 | 11 | 1.5 | 40.2 |
| $Al(citrate)_2(catecholate)^{2-/3-}$ | +1.25 | 11.5 | 0.5 | 13.4 |
| $Fe^{III/II}(H_2O)_6$ | +0.77 | 0 | 2 | 53.6 |
| $Ce^{IV/III}(H_2O)_x$ | +1.75 | 0 | 0.5 | 13.4 |

TABLE 3A

Calculated OCVs and theoretical energy density (Wh/L) for various other electrolyte couple pairs calculated from data in Table 2.

| | $Fe(CN)_6^{3-/4-}$ | | $Al(cit)_2(cat)^{2-/3-}$ | |
|---|---|---|---|---|
| Couple | OCV (V) | Energy Density (Wh/L) | OCV (V) | Energy Density (Wh/L) |
| $Mn(CN)_6^{3-/4-}$ | 1.78 | 35.8 | 1.85 | 12.4 |
| $Fe(catecholate)_3^{2-/3-}$ | 1.68 | 33.8 | 1.75 | 11.7 |
| $Ti(catecholate)_3^{2-/3-}$ | 1.63 | 21.8 | 1.70 | 11.4 |
| $Ti(pyrogallate)_3^{2-/3-}$ | 1.73 | 34.8 | 1.80 | 12.1 |
| $Ti(catecholate)_2(pyrogallate)^{2-/3-}$ | 1.68 | 33.8 | 1.75 | 11.7 |

TABLE 3A-continued

Calculated OCVs and theoretical energy density (Wh/L) for various other electrolyte couple pairs calculated from data in Table 2.

| | $Fe(CN)_6^{3-/4-}$ | | $Al(cit)_2(cat)^{2-/3-}$ | |
|---|---|---|---|---|
| Couple | OCV (V) | Energy Density (Wh/L) | OCV (V) | Energy Density (Wh/L) |
| Ti(catecholate)$_2$(ascorbate)$^{2-/3-}$ | 1.73 | 34.8 | 1.80 | 12.1 |
| Ti(catecholate)$_2$(gluconate)$^{2-/3-}$ | 1.78 | 35.8 | 1.85 | 12.4 |
| Ti(catecholate)$_2$(lactate)$^{2-/3-}$ | 1.67 | 33.6 | 1.74 | 11.7 |
| Ti(catecholate)(pyrogallate)-(lactate)$^{2-/3-}$ | 1.73 | 34.8 | 1.80 | 12.1 |
| Ti(citrate)$_3$ | 1.22 | 24.5 | 1.29 | 8.6 |

TABLE 3B

Calculated OCVs and theoretical energy density (Wh/L) for various electrolyte couple pairs calculated from data in Table 2.

| | $Fe(CN)_6^{3-/4-}$ | | $Al(cit)_2(cat)^{2-/3-}$ | |
|---|---|---|---|---|
| Couple | OCV (V) | Energy Density (Wh/L) | OCV (V) | Energy Density (Wh/L) |
| Ti$^{IV/III}$(lactate)$_1$ | 1.60 | 34.9 | 1.67 | 25.2 |
| Ti$^{IV/III}$(lactate)$_2$ | 1.46 | 31.8 | 1.53 | 23.1 |
| Ti$^{IV/III}$(lactate)$_3$ | 1.57 | 34.2 | 1.64 | 24.7 |
| Ti$^{IV/III}$(salicylate)$_3$ | 1.29 | 17.3 | 1.36 | 9.1 |
| Ti$^{IV/III}$(lactate)$_1$(malate)$_2$ | 1.51 | 30.4 | 1.58 | 21.2 |
| Ti$^{IV/III}$(malate)$_2$(salicylate) | 1.60 | 32.2 | 1.67 | 22.4 |
| Ti$^{IV/III}$(lactate)$_2$(glycinate) | 1.61 | 32.4 | 1.68 | 22.5 |
| Ti$^{IV/III}$(lactate)$_2$(salicylate) | 1.60 | 32.2 | 1.67 | 22.4 |
| Ti$^{IV/III}$(salicylate)$_2$(lactate) | 1.61 | 32.3 | 1.68 | 22.5 |
| Ti$^{IV/III}$(α-hydroxyacetate)$_2$(salicylate) | 1.60 | 32.2 | 1.67 | 22.4 |
| Ti$^{IV/III}$(malate)$_2$(sal) | 1.62 | 32.6 | 1.69 | 22.6 |
| Ti$^{IV/III}$(α-hydroxyacetate)$_2$(lactate) | 1.62 | 32.6 | 1.69 | 22.6 |
| Ti$^{IV/III}$(lactate)$_2$(α-hydroxyacetate) | 1.62 | 32.6 | 1.69 | 22.6 |
| Fe$^{III/II}$(salicylate)$_3$ | 1.18 | 15.8 | 1.25 | 8.4 |
| Fe$^{III/II}$(malate)$_3$ | 1.37 | 23.0 | 1.44 | 14.5 |
| Fe$^{III/II}$(α-hydroxyacetate)$_3$ | 1.51 | 25.3 | 1.58 | 15.9 |

TABLE 4

Calculated OCVs and theoretical energy density (Wh/L) for various electrolyte couple pairs calculated from data in Table 2 in mildly acidic solutions.

| | 2M Fe$^{III/II}$, pH 2 | | 0.5M Ce$^{IV/III}$, pH 2 | |
|---|---|---|---|---|
| Couple | OCV (V) | Energy Density (Wh/L) | OCV (V) | Energy Density (Wh/L) |
| Ti$^{IV/III}$(lactate)$_1$ | 1.32 | 33.2 | 2.30 | 34.7 |
| Ti$^{IV/III}$(lactate)$_2$ | 0.92 | 23.1 | 1.90 | 28.6 |

Example 1.3—Experimental Procedure for a 5 cm$^2$ Active Area Flow Battery

Cell hardware designed for 5 cm$^2$ active area and modified for acid flow was obtained from Fuel Cell Technologies (Albuquerque, N. Mex.). Carbon felt, nominally 3 mm thick, was obtained from Alfa Aesar (Ward Hill, Mass.) and MGL 370 carbon paper was obtained from Fuel Cell Earth (Stoneham, Mass.). Felts were dip-coated with a suspension of Vulcan XC-72 carbon (Cabot Corp., Boston, Mass.) and NAFION™ (Ion-Power, New Castle, Del.) and air-dried before use and carbon papers were used as received. NAFION™ HP, XL, or NR-212 cation exchange membranes were obtained from Ion-Power in the H+ form and were used as received. VITON™ gaskets were obtained from McMaster Carr (Robinsville, N.J.) and were cut to allow for a 5 cm$^2$ active area with ~1 cm$^2$ areas left above and below the felts for electrolyte ingress and egress from the positive and negative compartments of the cell. The cell was assembled using gaskets that provided a compression of ~25% of the measured thickness of the felts or papers. The membranes and electrodes were not pretreated before assembly. The electrolyte reservoirs were fashioned from Schedule 80 PVC piping with PVDF tubing and compression fittings. Masterflex™ L/S peristaltic pumps (Cole Parmer, Vernon Hills, Ill.) were used with Tygon™ tubing. Electrolytes were sparged with UHP argon through an oil-filled bubbler outlet before electrochemical testing and a head pressure of argon was maintained during the testing. An Arbin Instruments BT2000 (College Station, Tex.) was used to test the electrochemical performance, and a Hioki 3561 Battery HiTESTER (Cranbury, N.J.) was used to measure the AC resistance across the cell.

In a typical experiment, 50 mL each of electrolyte containing active material for the positive and negative electrode were loaded into separate reservoirs and sparged with argon for 20 minutes while circulating the electrolytes through the cell. The electrolytes were charged to 40% SOC (calculated from the concentrations of the active materials and the volumes of the electrolyte), the iV response of the cell was obtained, and then the electrolytes were cycled between 40 and 60% SOC. An analog output from the Hioki battery tester was recorded to monitor changes in the membrane and contact resistances.

Example 2

Figure 2:
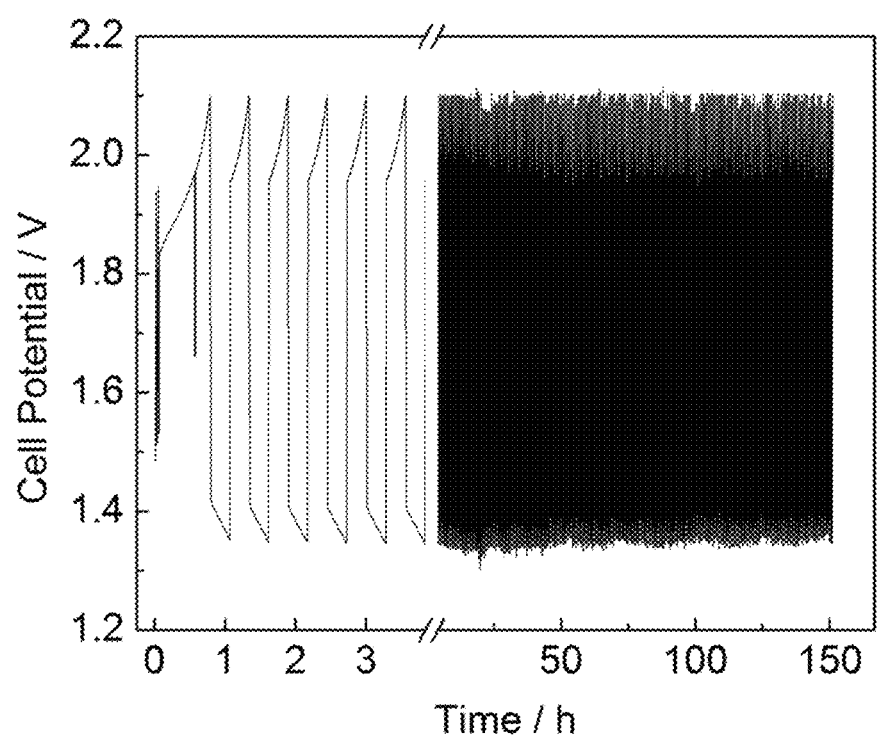
FIG. 2 provides stability performance data obtained during 250 charge/discharge cycles for a 5 cm$^2$ system based on $Ti^{4+/3+}(cat)_3^{2-/3-}$ and $Fe^{3+/2+}(CN)_6^{3-/4-}$, as described in Example 2.

A redox flow battery cell was assembled according to the methods described in Example 1 using titanium tris-catecholate (Ti$^{4+/3+}$(cat)$_3^{2-/3-}$) and ferri/ferro-cyanide (Fe$^{3+/2+}$(CN)$_6^{3-/4-}$) metal ligand coordination compounds as active materials for the negative and positive electrolytes, respectively. The active materials were prepared at concentrations of 0.5 M in 0.5 M pH 11 Na$_2$SO$_4$ supporting electrolyte (negative electrolyte, or negolyte) or no supporting electrolyte (positive electrolyte, or posolyte) and were flowed at 100 mL/min through the flow battery cell assembled using 5 cm$^2$ carbon felt electrodes and a NAFION™ cation selective membrane (50 μm thick) in Na$^+$ form. The cell was initially charged from 0 to 50% state of charge before several charge/discharge cycles was collected by charging and discharging the battery at a current density of ~150 mA/cm$^2$ and monitoring the resulting cell potential, FIG. 2. At open circuit, a cell potential of 1.63 V was observed as expected for equilibrium cell potential at 50% SOC based on the externally measured E$_{1/2}$ values for Ti$^{4+/3+}$(cat)$_3^{2-/3-}$ and Fe$^{3+/2+}$(CN)$_6^{3-/4-}$. Charge/discharge cycling revealed well behaved, reproducible voltage/current vs. time traces, demonstrating promising durability, FIG. 2. An RT voltage efficiency of 69% was measured for this system at 150 mA/cm$^2$. Typical resistances measured by the Hioki Battery Tester for the membrane and contact resistance component of cells built with NR212, XL, and HP membranes were 0.77, 0.60, and 0.5 ohm-cm$^2$, respectively.

Figure 3:
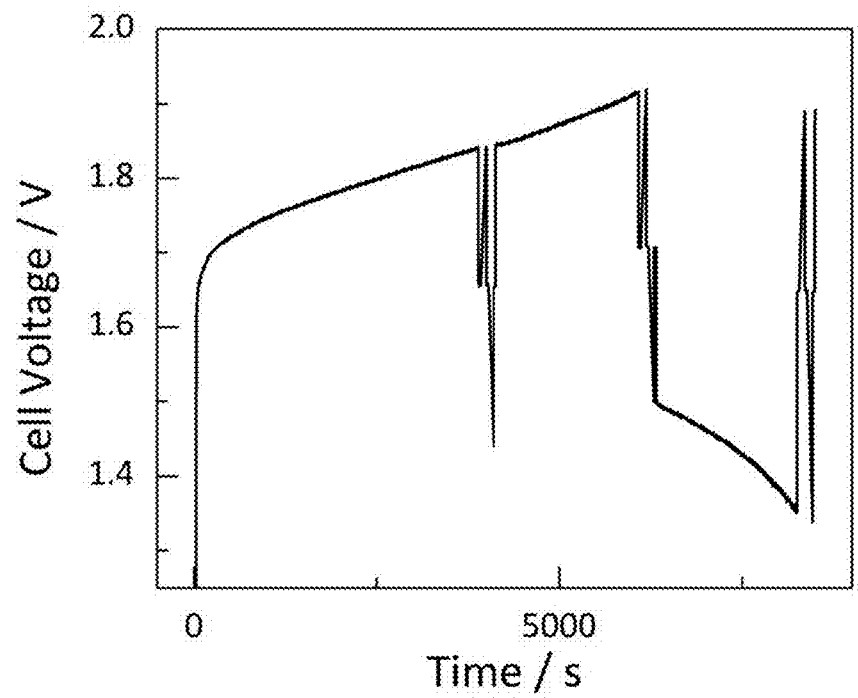
FIG. 3 provides a charge/discharge trace for a flow battery of the present invention as described in Example 2. This example contains $Ti^{4+/3+}(cat)_3^{2-/3-}$ and $Fe^{3+/2+}(CN)_6^{3-/4-}$ as first and second electrolytes, respectively. The battery was charged from 0% SOC to 60% SOC and then discharged to 40% SOC at a current density of 200 mA/cm$^2$ and a RT Voltage efficiency of ~76%.

FIG. 3 displays the charge/discharge characteristics for a flow battery of the present invention wherein the negative and positive active materials comprise $Ti^{4+/3+}(cat)_3^{2-/3-}$ and $Fe^{3+/2+}(CN)_6^{3-/4-}$, respectively. The cell potential increases as the battery is charged and decreases as the battery is discharged.

SOC), and comparing this quantity to twice the quantity of Ti in the positive electrolyte at the end of the experiment (accounting for the charge of −2 for the Ti(cat)$^3$ complex and +1 for Na$^+$ or K$^+$ ions). In this case, 5×10$^{-3}$ mol of Na$^+$/K$^+$ were passed in each cycle, and over the 283 cycles of the experiment approximately 1.42 mol of Na$^+$/K$^+$ were passed. Since the quantity of Ti in the positive electrolyte was measured as 2.3×10$^{-6}$ mol, a selectivity of ~3×10$^5$ can be determined (1.42 mol Na$^+$/K$^+$ divided by 2×2.3×10 mol Ti).

TABLE 5

| Membrane | Thickness (μm) | Initial Concentration (M) | Volume (L) | Membrane Area (m$^2$) | Titanium Flux (mol/ cm$^2$ day) | Estimated time to 5% xover |
|---|---|---|---|---|---|---|
| NR212 - subscale data | 50 | 0.5 | 0.05 | 0.0007 | 5 × 10$^{-8}$ | 196 years |

Example 3

Figure 4:
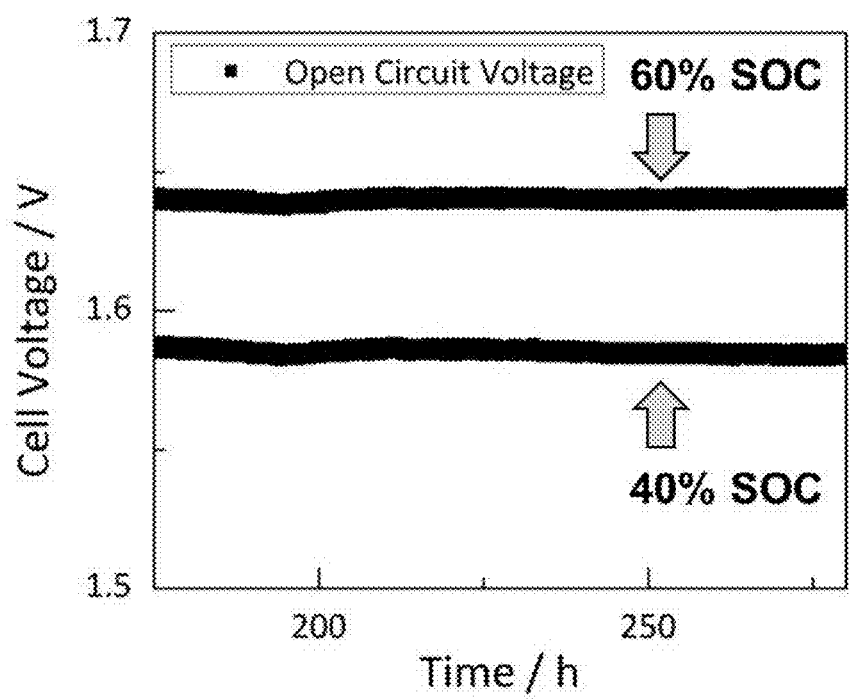
FIG. 4 provides current efficiency data obtained for a system based on $Ti^{4+/3+}(cat)_3^{2-/3-}$ and $Fe^{3+/2+}(CN)_6^{3-/4-}$, as described in Example 3.

A redox flow battery cell was assembled according to the methods described in Example 1.3 using titanium tris-catecholate ($Ti^{4+/3+}(cat)_3^{2-/3-}$) and ferri/ferro-cyanide ($Fe^{3+/2+}(CN)_6^{3-/4-}$) metal ligand coordination compounds as active materials for the negative and positive electrolytes, respectively. In a typical cell, stable voltages were observed upon repeatedly charging to 60% SOC and discharging to 40% SOC (see FIG. 4) when the discharge energy for each cycle was 99.8% of the charge energy, indicative of 99.8% roundtrip current efficiency. This was achieved by using a constant current density (e.g., 150 mA/cm$^2$) for both charge and discharge but with a discharge time that was slightly shorter than (i.e., 99.8% of) the charge time. Under these conditions, the open circuit voltages at 40 and 60% SOC were stable for extended periods of time.

Crossover flux data were obtained by measuring the concentrations of Fe and Ti in each electrolyte at the beginning and end of a suitably lengthy battery test, typically one to two weeks in duration for a membrane area of 7 cm$^2$. The concentrations were determined by Inductively Coupled Plasma-Mass Spectrometry (ICP-MS) experiments performed by Evans Analytical Group, Syracuse, N.Y. The moles of Fe in the Ti-containing electrolyte before the test were subtracted from the number of moles in the same electrolyte at the end of the test. This was converted to a flux by dividing the moles by the membrane area and the test duration.

In the present example, the active materials were prepared at concentrations of 0.5 M in 0.5 M pH 11 Na$_2$SO$_4$ electrolyte and were flowed at 100 mL/min through the flow battery cell assembled using 5 cm$^2$ carbon felt electrodes and a NAFION™ cation selective membrane (50 μm thick) in Na$^+$ form. The cell was initially charged from 0 to 50% state of charge before several charge/discharge cycles at a current density of 100 mA/cm$^2$. The cell was cycled between 40% and 60% SOC for 283 cycles over the course of a 163 hour experiment. The test was then terminated and a sample of the positive electrolyte was analyzed for Ti content. From the Ti concentration in the positive electrolyte, the total exposed membrane area (7 cm$^2$), and the time of exposure (163 hrs) a flux of 5×10 mol Ti cm$^{-2}$ day$^{-1}$ could be calculated, see Table 5. The selectivity for pumping Na$^+$ or K$^+$ ions across the membrane over the Ti complex over the course of this example can be calculated by computing the quantity of ions passed in each discharge cycle (in this case 60% to 40%

Typical fluxes for metal ligand coordination complexes in cells operated at 100 mA/cm$^2$ with boiled DuPont NAFION™ NR212 membranes (50 micron thick) were 5.0×10$^{-8}$ mol cm$^{-2}$ day$^{-1}$ for ferri/ferrocyanide and 6.5×10 mol cm$^{-2}$ day$^{-1}$ for titanium triscatecholate. Thus the iron and titanium complexes comprise 5.6×10$^{-5}$% and 7.2×10$^{-5}$%, respectively, of the total molar flux of ions passing through the unboiled membrane. For unboiled DuPont NAFION™ HP (20 micron thick), the measured fluxes were 1.1×10$^{-5}$ and 3.3×10 mol cm$^2$ day$^{-1}$ for the above iron and titanium complexes, respectively. Thus the iron and titanium complexes comprise 0.012% and 0.0037%, respectively, of the total molar flux of ions passing through the unboiled membrane. These data indicate that the average round trip current efficiencies over the tests for both the boiled and unboiled membranes were greater than 99.9%. These results are believed to be representative and typical for the compounds described herein.

Example 4

Figure 5:
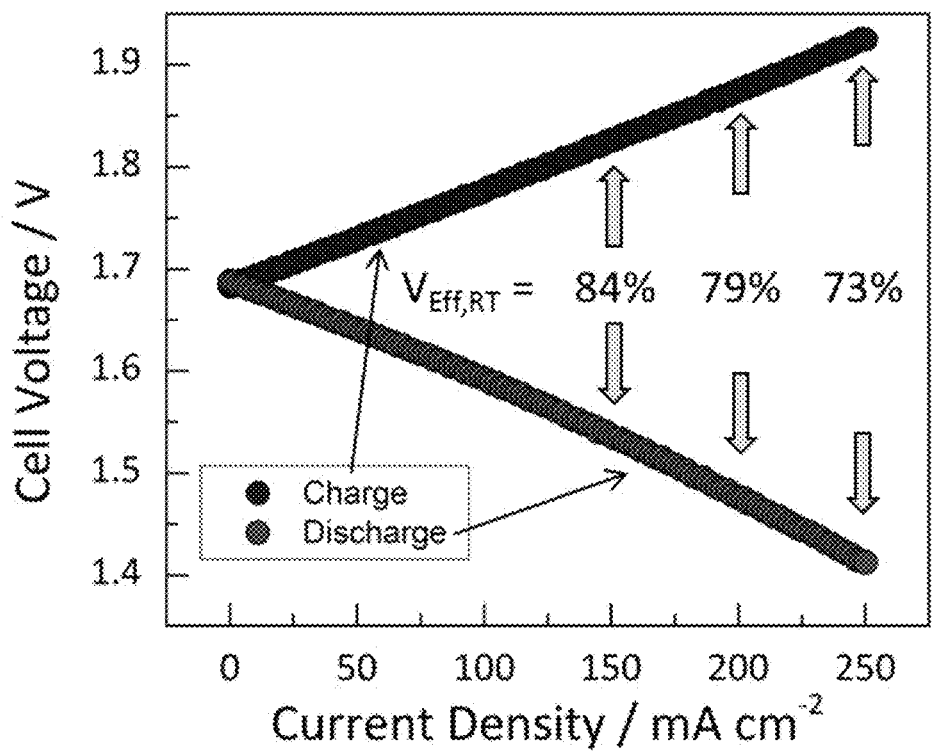
FIG. 5 provides voltage efficiency data, as a function of current density, for a system based on $Ti^{4+/3+}(cat)_2(pyrogallate)^{2-/3-}$ and $Fe^{3+/2+}(CN)_6^{3-/4-}$, as described in Example 4.

A redox flow battery cell was assembled according to the general methods described in Example 1.3, again using titanium bis-catecholate mono-pyrogallate ($Ti^{4+/3+}(cat)_2(gal)^{2-/3-}$) and ferri/ferro-cyanide ($Fe^{3+/2+}(CN)_6^{3-/4-}$) metal ligand coordination compounds as active materials for the negative and positive electrolytes, respectively. In this example the carbon felt electrodes were replaced with TORAY™ carbon paper electrodes that were catalyzed with Vulcan carbon and NAFION™ in a manner similar to that of Example 2. Additionally, flow fields of the "interdigitated" type were employed. The active material solution concentrations were increased to 1.5 M and the cell performance was evaluated by monitoring the cell potential on both charge and discharge cycles as a function of current density. As can be seen in FIG. 5, the cell maintains round trip voltage efficiencies of 84%, 79%, and 73% at current densities of 150, 200, and 250 mA/cm$^2$, respectively. In this configuration the flow battery active materials exhibited an energy density of 32.79 Wh/L.

Figure 6:
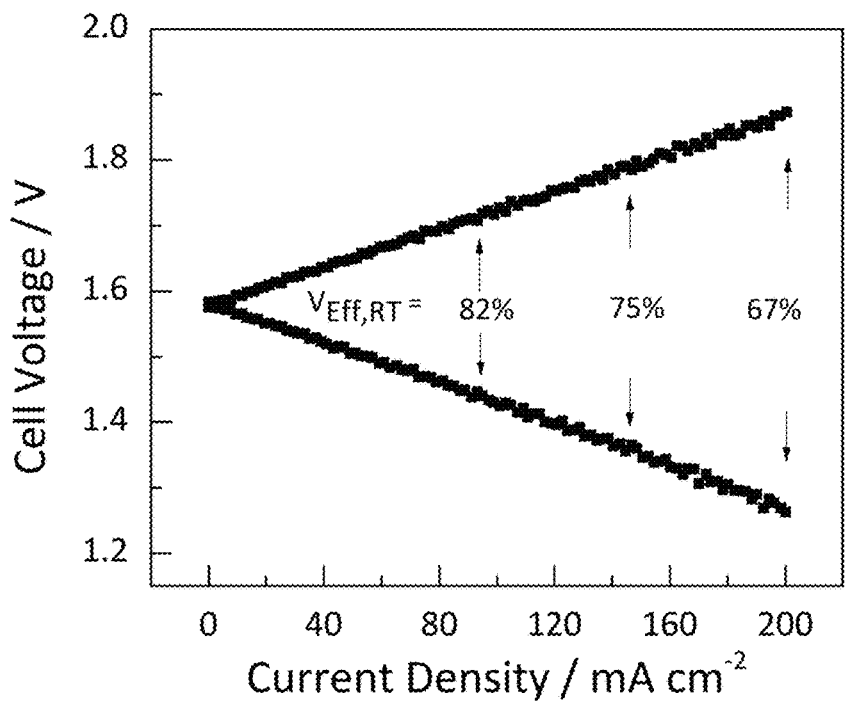
FIG. 6 provides voltage efficiency data, as a function of current density, for a system based on $Ti^{4+/3+}(cat)_3^{2-/3-}$ and $Fe^{3+/2+}(CN)_6^{3-/4-}$, as described in Example 4.
Figure 7:
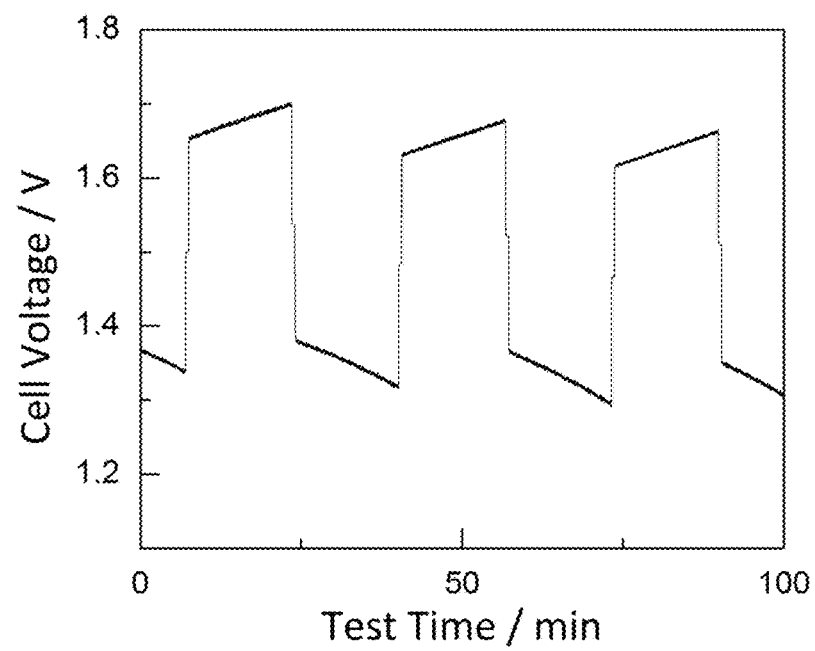
FIG. 7 provides a charge/discharge trace for a flow battery of the present invention. This example contains $Fe^{3+/2+}(cat)_3^{3-/4-}$ and $Fe^{3+/2+}(CN)_6^{3-/4-}$ as first and second electrolytes, respectively. The battery was charged from 0% SOC to 60% SOC and then discharged to 40% SOC at a current density of 100 mA/cm$^2$ and a RT voltage efficiency of ca. 82%.

The results of analogous experiments using $Ti^{4+/3+}(cat)_3^{2-/3-}$ and $Fe^{3+/2+}(CN)_6^{3-/4-}$ are shown in FIG. 6 and FIG. 7.

Example 5

Figure 8:
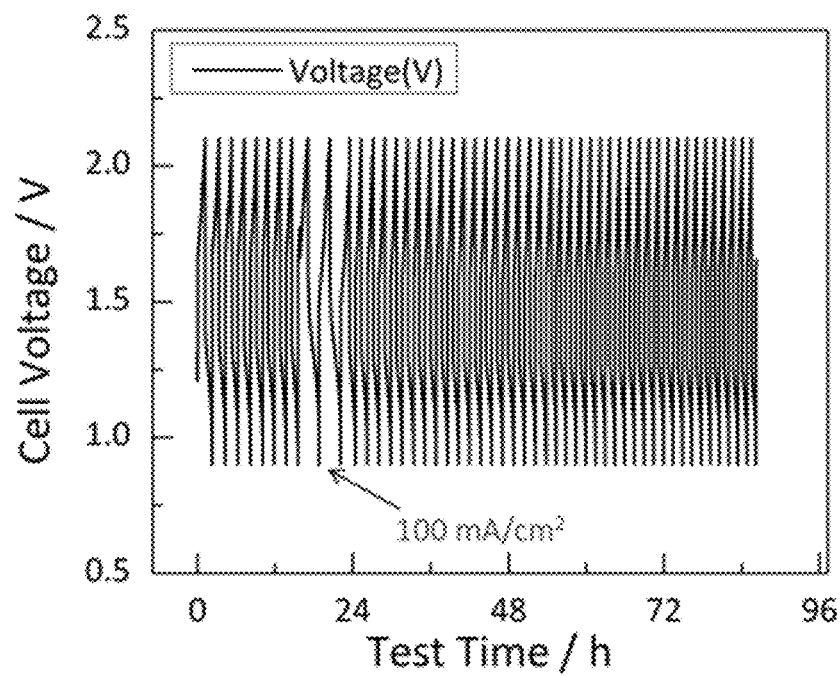
FIG. 8 provides data for cell voltage during charge-discharge cycling for 1 M Fe(CN)$_6$ as positive couple and 1 M Ti(lactate)$_2$(salicylate) as negative couple, both at pH 11, in a 5 cm$^2$ active area flow battery at a current density of 150 mA/cm$^2$ except for the area noted as 100 mA/cm$^2$.

A redox flow battery cell was assembled according to the methods described in Example 1.3 using titanium bis-lactate mono-salicylate ([$Ti^{4+/3+}$(lactate)$_2$(salicylate)]$^{2-/3-}$) and ferri/ferro-cyanide ([$Fe^{3+/2+}(CN)_6$]$^{3-/4-}$) metal ligand coordination compounds as active materials for the negative and positive electrolytes, respectively. The active material solutions were prepared at concentrations of 1 M with no additional supporting electrolyte and were flowed at 100 mL/min through the flow battery cell assembled using 5 cm$^2$ carbon paper electrodes and a NAFION™ cation selective membrane (25 μm thick) in the Na$^+$ form. The cell was initially charged from 0 to 25% state of charge before charge/discharge cycles were collected by charging and discharging the cell at 150 or 100 mA/cm$^2$ and monitoring the resulting cell potential, FIG. 8 (where visually wider cycles were taken at 100 instead of 150 mA/cm$^2$). At open circuit, a cell potential of 1.60 V was observed as expected for equilibrium cell potential at 50% SOC based on the externally measured $E_{1/2}$ values for [$Ti^{4+/3+}$(lactate)$_2$(salicylate)]$^{2-/3-}$ and [$Fe^{3+/2+}(CN)_6$]$^{3-/4-}$. Charge/discharge cycling revealed well behaved, reproducible voltage/current vs. time traces, demonstrating promising durability, FIG. 8. An RT voltage efficiency of 67% was measured for this system at 150 mA/cm$^2$. Typical resistances measured by the Hioki Battery Tester for the membrane and contact resistance component of cells built with NR212, XL, and HP membranes were 0.77, 0.60, and 0.5 ohm-cm$^2$, respectively.

Example 6

Figure 9:
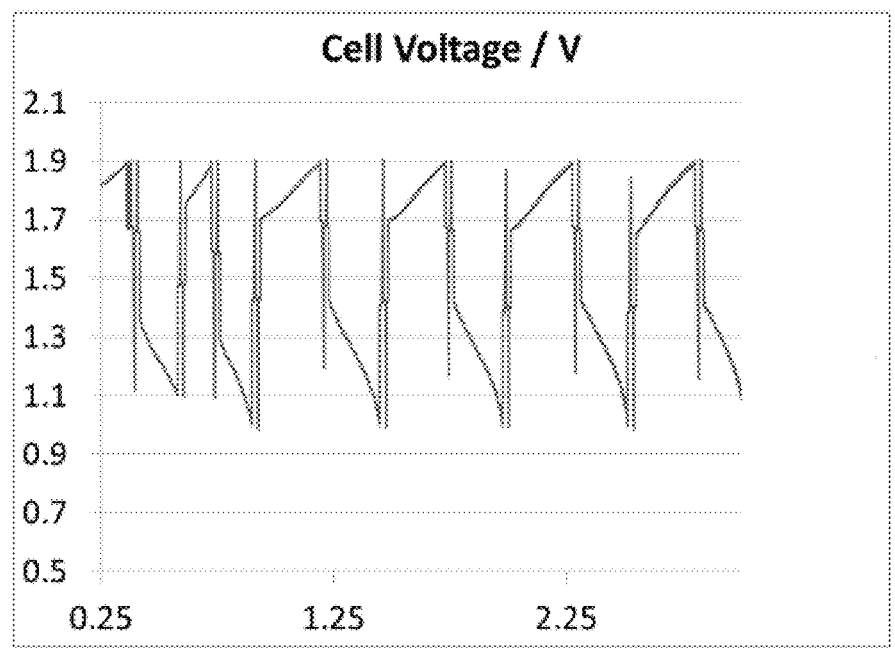
FIG. 9 provides cell voltage in volts plotted versus test time in hours during charge-discharge cycling and iV traces between each cycle for 1 M Fe(CN)$_6$ as positive couple and 1 M Ti(lactate)$_2$(α-hydroxyacetate) as negative couple, both at pH 11, in a 5 cm$^2$ active area flow battery at a current density of 150 mA/cm$^2$.

A redox flow battery cell was assembled according to the methods described in Example 1.3 using titanium bis-lactate mono-glycolic acid ([$Ti^{4+/3+}$(lactate)$_2$α-hydroxyacetate)]$^{2-/3-}$) and ferri/ferro-cyanide ([$Fe^{3+/2+}(CN)_6$]$^{3-/4-}$) metal ligand coordination compounds as active materials for the negative and positive electrolytes, respectively. In a typical cell, stable voltages were observed upon repeatedly charging to 75% SOC and discharging to 25% SOC (see FIG. 9) when the discharge energy for each cycle was 99.8% of the charge energy, indicative of 99.8% roundtrip current efficiency. This was achieved by using a constant current density (e.g., 150 mA/cm$^2$) for both charge and discharge but with a discharge time that was slightly shorter than (i.e., 99.8% of) the charge time. Under these conditions, the open circuit voltages at 25 and 75% SOC were stable for extended periods of time.

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety.

What is claimed:

1. A flow battery, comprising:
   a first electrolyte comprising an aqueous solution comprising a first active material and at least one mobile ion;
   a second electrolyte comprising an aqueous solution comprising a second active material and at least one mobile ion;
   wherein at least one of the first active material and the second active material comprises a metal ligand coordination compound comprising a chelating organic ligand and the metal ligand coordination compound bears a negative ionic charge;
   the first electrolyte is substantially free of the second active material and the second electrolyte is substantially free of the first active material;
   a first electrode in contact with said first electrolyte;
   a second electrode in contact with said second electrolyte; and
   a separator;
   wherein the flow battery is capable of operating with a current efficiency of at least 85% with a current density of at least about 100 mA/cm$^2$ and wherein the separator has a thickness of about 100 microns or less,
   wherein the separator comprises a porous membrane having pores with an average size distribution of between about 0.001 nm and 100 nm, and
   wherein the at least one of the first active material and the second active material have an average diameter that is about 50% greater than an average pore size of the porous membrane.

2. The flow battery of claim 1, wherein diffusive crossover of active materials represents 2% or less current efficiency loss during charge or discharge.

3. The flow battery of claim 1, wherein electrical shorts account for less than or equal to 2% current efficiency loss during charge or discharge.

4. The flow battery of claim 1, wherein transference of active materials represents 2% or less current efficiency loss during charge or discharge.

5. The flow battery of claim 1, wherein an amount of current that is diverted to parasitic reactions represents 4% or less current efficiency loss during charge or discharge.

6. The flow battery of claim 1, wherein shunt currents within fluidic manifolds represent 5% or less current efficiency loss during charge or discharge.

7. The flow battery of claim 1, wherein the first and second active materials are first and second metal ligand coordination compounds, the first metal ligand coordination compound comprising a first metal and a first ligand and the second metal ligand coordination compound comprising a second metal and a second ligand, at least one of the first ligand and the second ligand being a chelating organic ligand and at least one of the first metal ligand coordination compound and the second metal ligand coordination compound bearing a negative ionic charge.

8. The flow battery of claim 7, wherein the first and second ligands comprise one or more of the following: $CN^-$, $H_2O$, halo, hydroxyl, amines, polyamines, polyalcohols, anions of carboxylic acids, dicarboxylic acids, polycarboxylic acids, amino acids, carbonyl or carbon monoxide, nitride, oxo, sulfide, pyridine, pyrazine, amido groups, imido groups, alkoxy groups, siloxy, thiolate, catechol, pyrogallate, bipyridine, bipyrazine, ethylenediamine, diols, terpyridine, diethylenetriamine, triazacyclononane, trisaminomethane, quinones, hydroquinones, viologens, pyridinium, acridinium, polycyclic aromatic hydrocarbons or combinations thereof.

9. The flow battery of claim 7, wherein the first metal comprises one or more of the following atoms: Al, Ca, Co, Cr, Cu, Fe, Mg, Mn, Mo, Ni, Pd, Pt, Ru, Sn, Ti, V, Zn, Zr, or a combination thereof.

10. The flow battery of claim 7, wherein the second metal comprises one or more of the following atoms: Al, Ca, Co, Cr, Cu, Fe, Mg, Mn, Mo, Ni, Pd, Pt, Ru, Sn, Ti, V, Zn, Zr, or a combination thereof.

11. The flow battery of claim 7, wherein the first metal and the second metal compound differ in reduction potential by at least about 0.5 volts.

12. The flow battery of claim 7, wherein the first metal and the second metal differ in reduction potential by at least about 1.0 volt.

13. The flow battery of claim 7, wherein the first metal is the same as the second metal; and wherein the first metal and the second metal have different oxidation states.

14. The flow battery of claim 1, wherein the second active material is different from the first active material.

15. The flow battery of claim 1, wherein the mobile ion carries at least about 80% of the ionic current during charge/discharge.

16. The flow battery of claim 1, wherein the mobile ion carries at least about 85% of the ionic current during charge/discharge.

17. The flow battery of claim 1, wherein the mobile ion comprises one or more of the following: $Li^+$, $K^+$, $Na^+$, $Mg^{2+}$, $Ca^{2+}$, $Sr^{2+}$, $Cl^-$, $Br^-$, $I^-$, $OH^-$ or a combination thereof.

18. The flow battery of claim 1, wherein the separator has a thickness of 50 microns or less and the flow battery operates with at least about 98% current efficiency.

19. The flow battery of claim 1, wherein the separator has a thickness of 25 microns or less and the flow battery operates with at least about 96% current efficiency.

20. The flow battery of claim 1, wherein the flow battery is capable of operating with shorting losses of about 1 $mA/cm^2$ or less.

21. The flow battery of claim 1, wherein the separator comprises a polymer, wherein the polymer is a cationic exchange membrane comprised of anionic functional groups.

22. The flow battery of claim 21, wherein the polymer comprises one or more of the following: a cross-linked halogenated alkylated compound with a polyamine, a cross-linked aromatic polysulfone type polymer with a polyamine, perfluorinated hydrocarbon sulfonate ionomers, sulfonated polyetherether ketone (sPEEK), sulfonated poly(phthalazinone ether ketone), sulfonated phenolphthalein poly(ether sulfone), sulfonated polyimides, sulfonated polyphosphazene, sulfonated polybenzimidazole, aromatic polymers containing a sulfonic acid group, sulfonated perfluorinated polymer, fluorinated ionomers with sulfonate groups, carboxylate groups, phosphate groups, boronate acid groups, or combinations thereof, polyaromatic ethers with sulfonate or carboxylate groups, poly(4-vinyl pyridine), poly(2-vinyl pyridine), poly(styrene-b-2-vinylpyridine), poly(vinyl pyrrolidine), poly(1-methyl-4-vinylpyridine), poly[(2,2'-m-phenylene)-5,5'-bibenzimidazole][poly(2,2'-(m-phenylene)-5,5'-bibenzimidazole], poly(2,5-benzimidazole), polyacrylate, polymethacrylate or combinations thereof.

23. The flow battery of claim 1, wherein the separator comprises a solid polymer, wherein the solid polymer is an anionic exchange membrane comprised of cationic functional groups.

24. The flow battery of claim 23, wherein the polymer comprises one or more of the following: polydiaryldimethylammonium, poly(methacryloyloxyethyltriethylammonium), poly(diallylammonium), or combinations thereof.

25. The flow battery of claim 1, wherein the separator comprises a polymer and the polymer comprises one or more of the following: polytetrafluoroethylene, polyvinyl, polystyrene, polyethylene, polypropylene, polyesters, perfluorinated polymers, polyvinylidene fluoride, poly(etherketone-ether-ketone-ketone), poly(vinyl chloride), substituted vinyl polymers, polystyrene, or combinations thereof.

26. The flow battery of claim 25, wherein the separator comprises a membrane further comprising a reinforcement material.

27. The flow battery of claim 26, wherein the reinforcement material comprises one or more of the following: nylon, cotton, polyesters, crystalline silica, crystalline titania, amorphous silica, amorphous titania, rubber, asbestos, wood or a combination thereof.

28. The flow battery of claim 27, wherein a volume percent of reinforcement is determined at a given membrane thickness by: desired thickness=10 μm/(1-reinforcement vol %).

29. The flow battery of claim 1, wherein the first and second active materials are substantially in the form of metal ligand coordination compounds and have an average diameter that is about 20% larger than an average pore size of the porous membrane when the average size distribution of the pores is substantially uniform.

30. The flow battery of claim 1, wherein the first and second active materials are substantially in the form of metal ligand coordination compounds having hydration spheres such that the metal ligand coordination compounds are characterized by hydrodynamic diameters that are about 35% larger than an average size distribution of the pores.

31. The flow battery of claim 1, wherein the first and second active materials are substantially in the form of metal ligand coordination compounds that are coordinated to at least one water molecule and have hydrodynamic diameters that are about 10% larger than an average size distribution of the pores when the average size distribution of the pores is substantially uniform.

32. A flow battery, comprising:
a first electrolyte comprising an aqueous solution comprising a first active material and at least one mobile ion;
a second electrolyte comprising an aqueous solution comprising a second active material and at least one mobile ion;
wherein at least one of the first active material and the second active material comprises a metal ligand coordination compound comprising a chelating organic ligand and the metal ligand coordination compound bears a negative ionic charge;
the first electrolyte is substantially free of the second active material and the second electrolyte is substantially free of the first active material;
a first electrode in contact with said first electrolyte;
a second electrode in contact with said second electrolyte; and
a separator having a thickness of about 100 microns or less;
wherein the flow battery is capable of operating with a round trip voltage efficiency of at least 60% with a current density of at least about 100 $mA/cm^2$,
wherein the separator comprises a porous membrane having pores with an average size distribution of between about 0.001 nm and 100 nm, and
wherein the at least one of the first active material and the second active material have an average diameter that is about 50% greater than an average pore size of the porous membrane.

33. The flow battery of claim 32, wherein the flow battery is capable of operating with a voltage efficiency of at least about 70%, of at least about 80%, or of at least about 90%.

34. The flow battery of claim 32, wherein the second active material is different from the first active material.

35. A flow battery, comprising:
a first electrolyte comprising an aqueous solution comprising a first active material and at least one mobile ion;
a second electrolyte comprising an aqueous solution comprising a second active material and at least one mobile ion;
wherein at least one of the first active material and the second active material comprises a metal ligand coordination compound comprising a chelating organic ligand and the metal ligand coordination compound bears a negative ionic charge;
the first electrolyte is substantially free of the second active material and the second electrolyte is substantially free of the first active material;
a first electrode in contact with said first electrolyte;
a second electrode in contact with said second electrolyte; and
a separator of thickness of about 100 microns or less having a selectivity in a range of about 50 to about 1,000,000 for one mobile ion over the first and second active materials;
wherein the flow battery is capable of operating with a current efficiency of at least 85% with a current density of at least about 100 mA/cm$^2$,
wherein the separator comprises a porous membrane having pores with an average size distribution of between about 0.001 nm and 100 nm, and
wherein the at least one of the first active material and the second active material have an average diameter that is about 50% greater than an average pore size of the porous membrane.

36. The flow battery of claim 35, wherein the separator has a selectivity in a range of about 50 to about 300 for at least one mobile ion over the first and second active materials.

37. The flow battery of claim 35, wherein the separator has a selectivity in a range of 100 to about 1000 for at least one mobile ion over the first and second active materials.

38. The flow battery of claim 35, wherein the second active material is different from the first active material.

39. A flow battery, comprising:
a first electrolyte comprising an aqueous solution comprising a first active material and at least one mobile ion;
a second electrolyte comprising an aqueous solution comprising a second active material and at least one mobile ion;
wherein at least one of the first active material and the second active material comprises a metal ligand coordination compound comprising a chelating organic ligand and the metal ligand coordination compound bears a negative ionic charge;
the first electrolyte is substantially free of the second active material and the second electrolyte is substantially free of the first active material;
a first electrode in contact with said first electrolyte;
a second electrode in contact with said second electrolyte; and
a separator having a thickness of about 100 microns or less and having a diffusion rate through the separator for the first active material, the second active material, or both of $1\times10^{-7}$ mol/cm$^2$-sec or less;
wherein the flow battery is capable of operating with a current efficiency of at least 85% with a current density of at least about 100 mA/cm$^2$,
wherein the separator comprises a porous membrane having pores with an average size distribution of between about 0.001 nm and 100 nm, and
wherein the at least one of the first active material and the second active material have an average diameter that is about 50% greater than an average pore size of the porous membrane.

40. The flow battery of claim 39, wherein the first active material, the second active material, or both have a diffusion rate through the separator of $1\times10^{-9}$ mol/cm$^2$-sec or less, $1\times10^{-11}$ mol/cm$^2$-sec or less, $1\times10^{-13}$ mol/cm$^2$-sec or less, or $1\times10^{-15}$ mol/cm$^2$-sec or less.

41. The flow battery of claim 39, wherein the second active material is different from the first active material.

42. A flow battery, comprising:
a first electrolyte comprising an aqueous solution comprising a first active material and at least one mobile ion;
wherein the first active material has a net ionic charge;
a second electrolyte comprising an aqueous solution comprising a second active material and at least one mobile ion;
wherein the second active material has a net ionic charge, the net ionic charge of the second active material being of the same sign as the net ionic charge of the first active material; and
wherein at least one of the first active material and the second active material comprises a metal ligand coordination compound comprising a chelating organic ligand and the metal ligand coordination compound bears a negative ionic charge;
the first electrolyte is substantially free of the second active material and the second electrolyte is substantially free of the first active material;
a first electrode in contact with said first electrolyte;
a second electrode in contact with said second electrolyte; and
a separator of thickness of about 100 microns or less, the separator comprising an ionomer membrane also having a net ionic charge;
wherein the sign of the net ionic charges of the first and second active materials matches that of the ionomer membrane; and wherein the flow battery is capable of operating with a current efficiency of at least 90% with a current density of at least 100 mA/cm$^2$,
wherein the separator comprises a porous membrane having pores with an average size distribution of between about 0.001 nm and 100 nm, and
wherein the at least one of the first active material and the second active material have an average diameter that is about 50% greater than an average pore size of the porous membrane.

43. The flow battery of claim 42, wherein an ionomer within the ionomer membrane has an ionomer mass to molar content on an areal basis of $2\times10^{-3}$ g ionomer/cm$^2$ or less.

44. A flow battery, comprising:
a first electrolyte comprising an aqueous solution comprising a first active material and at least one mobile ion;
a second electrolyte comprising an aqueous solution comprising a second active material and at least one mobile ion;

wherein at least one of the first active material and the second active material comprises a metal ligand coordination compound comprising a chelating organic ligand and the metal ligand coordination compound bears a negative ionic charge;

the first electrolyte is substantially free of the second active material and the second electrolyte is substantially free of the first active material;

a first electrode in contact with said first electrolyte;

a second electrode in contact with said second electrolyte; and a separator of thickness of about 100 microns or less, wherein the separator has a plurality of layers wherein at least one layer is capable of ionic conduction and at least one other layer is capable of selective ion transport; and wherein the flow battery is capable of operating with a current efficiency of at least 90% with a current density of at least about 100 mA/cm$^2$, wherein the separator comprises a porous membrane having pores with an average size distribution of between about 0.001 nm and 100 nm, and wherein the at least one of the first active material and the second active material have an average diameter that is about 50% greater than an average pore size of the porous membrane.

45. The flow battery of claim 44, wherein the at least one layer comprises at least one of the first electrolyte or the second electrolyte imbibed onto the separator.

46. The flow battery of claim 44, wherein a desired areal resistance range for the separator is determined by $R_{total}$ [ohm-cm$^2$]=$K_{membrane}/10^{-6}$ m+(porosity$_{sep}$^1.5*$K_{electrolyte}$)/thickness$_{sep}$.

47. The flow battery of claim 44, wherein the at least one other layer capable of selective ion transport comprises one or more of the following: perfluorinated sulfonate polymer, perfluorinated hydrocarbon sulfonate ionomers, sulfonated polyetherether ketone (sPEEK), sulfonated poly(phthalazinone ether ketone), sulfonated phenolphthalein poly(ether sulfone), sulfonated polyimides, sulfonated polyphosphazene, sulfonated polybenzimidazole, polyaromatic ethers with sulfonic or carboxylic acid groups, or combinations thereof.

48. The flow battery of claim 44, wherein at least one layer of the plurality of layers is a porous membrane.

* * * * *

UNITED STATES PATENT AND TRADEMARK OFFICE
CERTIFICATE OF CORRECTION

PATENT NO. : 9,865,893 B2  
APPLICATION NO. : 13/949530  
DATED : January 9, 2018  
INVENTOR(S) : Esswein et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 48 days.

Signed and Sealed this  
Fifth Day of February, 2019

Andrei Iancu  
*Director of the United States Patent and Trademark Office*